United States Patent
Kozaki et al.

(10) Patent No.: US 9,439,204 B2
(45) Date of Patent: Sep. 6, 2016

(54) WIRELESS DEVICE AND COMMUNICATION CHANNEL SELECTION METHOD

(71) Applicant: FUJITSU LIMITED, Kawasaki-shi, Kanagawa (JP)

(72) Inventors: Satoshi Kozaki, Kanazawa (JP); Kyohei Tanaka, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 253 days.

(21) Appl. No.: 14/481,041

(22) Filed: Sep. 9, 2014

(65) Prior Publication Data
US 2014/0376496 A1 Dec. 25, 2014

Related U.S. Application Data

(63) Continuation of application No. PCT/JP2012/058463, filed on Mar. 29, 2012.

(51) Int. Cl.
| | |
|---|---|
| *H04W 72/08* | (2009.01) |
| *H04W 28/02* | (2009.01) |
| *H04W 40/16* | (2009.01) |
| *H04W 40/02* | (2009.01) |
| *H04W 72/02* | (2009.01) |
| *H04W 16/14* | (2009.01) |

(52) U.S. Cl.
CPC ....... *H04W 72/082* (2013.01); *H04W 28/0236* (2013.01); *H04W 40/02* (2013.01); *H04W 40/16* (2013.01); *H04W 72/02* (2013.01); *H04W 16/14* (2013.01)

(58) Field of Classification Search
None
See application file for complete search history.

(56) References Cited

U.S. PATENT DOCUMENTS

| | | | | |
|---|---|---|---|---|
| 6,628,639 | B1* | 9/2003 | Ishii | H04W 76/02 370/333 |
| 2001/0039183 | A1* | 11/2001 | Kobayashi | H04B 1/10 455/67.13 |
| 2002/0041584 | A1* | 4/2002 | Sashihara | H04W 72/02 370/337 |

FOREIGN PATENT DOCUMENTS

| | | |
|---|---|---|
| JP | 2002-158667 | 5/2002 |
| JP | 2008-219444 | 9/2008 |
| WO | 2004077746 | 9/2004 |

OTHER PUBLICATIONS

International Search Report, mailed in connection with PCT/JP2012/058463 and mailed Jun. 26, 2012.
Xinming Zhang et al., "An Average Link Interference-Aware Routing Protocol for Mobile Ad Hoc Networks", Wireless and Mobile Communications, ICWMC '07, Third International Conference on Mar. 4-9, 2007 (7 pages).
P. Fazio et al., A New Channel Assignment Scheme for Interference-Aware Routing in Vehicular Networks,Vehicular Technology Conference (VTC Spring), 2011 IEEE 73rd, May 15-18, 2011, pp. 1-5 (6 pages).

* cited by examiner

*Primary Examiner* — Ashley Shivers
(74) *Attorney, Agent, or Firm* — Fujitsu Patent Center

(57) ABSTRACT

A wireless device includes a detecting unit, a sending unit, and a selecting unit. The detecting unit detects, for each communication channel while switching multiple communication channels, interference information. The sending unit sends to a destination wireless device, a packet in which the detected interference information are sequentially stored for each wireless device. The selecting unit receives the packet. When the wireless device does not correspond to the destination wireless device, the selecting unit transfers the packet. When the wireless device corresponds to the destination wireless device, the selecting unit selects, on the basis of the pieces of the interference information that are sequentially stored in the packet and the detected interference information, a communication channel.

5 Claims, 19 Drawing Sheets

| COMMUNICA-TION CHANNEL | PERIPHERAL NODE | RECEIVED RADIO WAVE LEVEL | INTERFER-ENCE FLAG |
|---|---|---|---|
| CH#1 | NODE 100h | −102 dBm | 0 |
| CH#2 | NODE 100b | −102 dBm | 1 |
| | NODE 100c | −90 dBm | |
| | NODE 100d | −85 dBm | |
| CH#3 | − | − | 0 |

FIG.5

| DESTINATION |
|---|
| SEND SOURCE |
| INTERFERENCE INFORMATION ON NODE 100a |
| INTERFERENCE INFORMATION ON NODE 100c |
| INTERFERENCE INFORMATION ON NODE 100e |
| ⋮ |
| INTERFERENCE INFORMATION ON NODE 100n |

FIG.6

| INTERFERENCE INFORMATION ON NODE 100a | COMMUNICATION CHANNEL | CH#1 | CH#2 | CH#3 |
|---|---|---|---|---|
| | INTERFERENCE FLAG | 0 | 1 | 0 |

FIG.22

| INTERFERENCE INFORMATION ON NODE 100d | COMMUNICATION CHANNEL | CH#1 | CH#2 | CH#3 |
|---|---|---|---|---|
| | INTERFERENCE FLAG | 0 | 0 | 0 |

FIG.23

| INTERFERENCE INFORMATION ON NODE 100d | COMMUNICATION CHANNEL | CH#1 | CH#2 | CH#3 |
|---|---|---|---|---|
| | INTERFERENCE FLAG | 0 | 0 | 0 |
| INTERFERENCE INFORMATION ON NODE 100c | COMMUNICATION CHANNEL | CH#1 | CH#2 | CH#3 |
| | INTERFERENCE FLAG | 1 | 1 | 1 |

WIRELESS DEVICE AND COMMUNICATION CHANNEL SELECTION METHOD

CROSS-REFERENCE TO RELATED APPLICATION

This application is a continuation of International Application No. PCT/JP2012/058463, filed on Mar. 29, 2012, the entire contents of which are incorporated herein by reference.

FIELD

The embodiment discussed herein is related to a wireless device and a communication channel selection method.

BACKGROUND

In recent years, there is a multi hop networks in which wireless devices that measure data, such as a water level, a temperature, or the like, are arranged in multiple locations and the data measured by each of the wireless devices is sent and received. Hereinafter, the wireless devices are simply referred to as nodes. In the multi hop network, if each of the nodes is connected by using a wired connection, a cable laying work is complicated. Accordingly, in the multi hop network, a study has been conducted on a technology that wirelessly connects each of the nodes and then sends and receives data by using a predetermined communication channel selected from the radio frequency bandwidth.

In the multi hop network in which each of the nodes are wirelessly connected, there is a problem of radio frequency interference in which, when nodes that are arranged close to each other simultaneously send and receive data by using a communication channel with the same radio frequency bandwidth, the radio waves from the nodes interfere with each other. As the technology that solves this radio frequency interference problem, there is a known Collision Avoidance mechanism, such as Carrier Sense Multiple Access/Collision Avoidance (CSMA/CA) mechanism or Request To Send/Clear To Send (RTS/CTS) mechanism. With the CSMA/CA mechanism, before each node transmits a radio wave, each of the nodes checks a sending status of a radio wave of the other node that is located in the same communication channel. With the RTS/CTS, before each node transmits a radio wave, each of the nodes sends a query, to a master station that is referred to as an access point, about the availability of the transmission of a radio wave in the same communication channel.

However, with the CSMA/CA mechanism or the RTS/CTS mechanism, each of the nodes avoids the collision between radio waves by using the same communication channel and thus each of the nodes is not able to send and receive data until the other node located in the vicinity of the node stops the transmission of the radio wave. Consequently, the throughput may possibly be reduced.

In contrast, there is a proposed technology that arbitrates a collision between radio waves by using multiple communication channels that can send and receive data. With this technology, a master station that performs overall control of multiple nodes searches the multiple communication channels that can send and receive data for a free channel that is not used by the other node and then selects the searched free channel as a communication channel that sends and receives the data. The master station broadcasts a beacon signal that includes information on the selected communication channel to the nodes controlled by the master station. The nodes received the beacon signal starts to send and receive the data by using the free channel that is indicated by the beacon signal.

Patent Document 1: Japanese Laid-open Patent Publication No. 2002-158667

However, with the conventional technology described above, there is a problem in that the nodes arranged outside the reach range of the beacon signal are not able to select an appropriate communication channel. If the nodes are not able to select an appropriate communication channel, the radio waves from the nodes may possibly interfere with each other and thus the throughput may possibly be reduced.

In the following, the problem of the conventional technology will be described. FIG. 24 is a schematic diagram illustrating a problem of a conventional technology. In the example illustrated in FIG. 24, nodes 10a to 10h are wirelessly connected. In this example, it is assumed that the node 10a is a master station, it is assumed that the node 10a selects, as the communication channel that is used to send and receive data, a free channel that is searched from multiple communication channels with the radio frequency bandwidth. The node 10a that is the master station broadcasts a beacon signal that includes therein information on the selected free channel. A node 10b is arranged in a reach range B of the beacon signal sent from the node 10a. Consequently, after the node 10b receives the beacon signal, the node 10b can send and receive data to and from the node 10a by using the free channel that is indicated by the beacon signal. In contrast, the nodes 10c to 10h are arranged outside the reach range B of the beacon signal. Consequently, the nodes 10c to 10h are not able to recognize the free channel indicated by the beacon signal and thus is not able to select an appropriate communication channel. Thus, the nodes 10c to 10h may possibly disorderly select the same communication channel. In such a case, the radio waves from the nodes interfere with each other and thus the throughput is reduced.

SUMMARY

According to an aspect of an embodiment, a wireless device includes a detecting unit that detects, for each communication channel while switching multiple communication channels that can be used to send and receive data, interference information indicating whether radio frequency interference from a peripheral wireless device is present; a sending unit that sends, before the data is sent and received, to a destination wireless device that is the destination of the data, a packet in which pieces of the interference information detected by the detecting unit are sequentially stored for wireless devices; and a selecting unit that receives the packet, that transfers, when the wireless device does not correspond to the destination wireless device that is the destination of the packet, the packet in which the interference information detected by the detecting unit is additionally stored, and that selects, when the wireless device corresponds to the destination wireless device that is the destination of the packet, on the basis of the pieces of the interference information that are sequentially stored in the packet for wireless devices and on the basis of the interference information detected by the detecting unit, the communication channel that is used to send and receive the data The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a schematic diagram illustrating an example of the data structure of a confirmation packet according to the embodiment;

FIG. 6 is a schematic diagram illustrating an example of the data structure of interference information on a node that is stored in the confirmation packet;

FIG. 22 is a schematic diagram illustrating an example of a confirmation packet sent by a node 100d;

FIG. 23 is a schematic diagram illustrating an example of a confirmation packet transferred by a node 100c.

DESCRIPTION OF EMBODIMENT

Preferred embodiment of the present invention will be explained with reference to accompanying drawings. The present invention is not limited to the embodiment.

Figure 1:
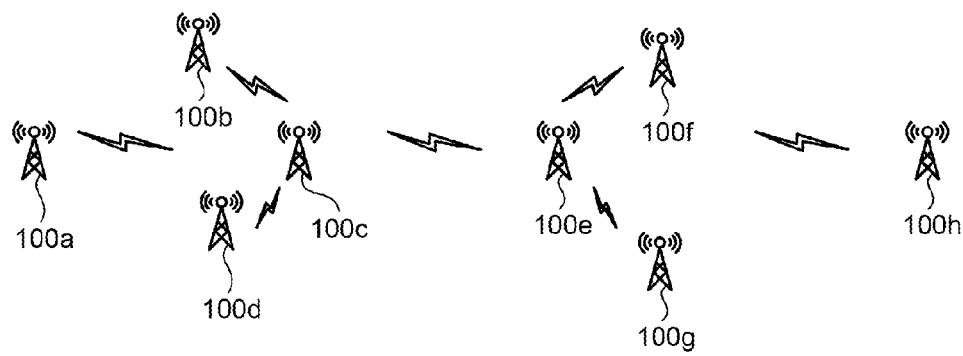
FIG. 1 is a schematic diagram illustrating the configuration of a multi hop network according to an embodiment of the present invention.

The configuration of a multi hop network according to the embodiment will be described. FIG. 1 is a schematic diagram illustrating the configuration of a multi hop network according to an embodiment of the present invention. As illustrated in FIG. 1, the multi hop network includes nodes 100a to 100h. The nodes 100a to 100h are an example of wireless devices. Each of the nodes 100a to 100h is wirelessly connected to the adjacent nodes. For example, the node 100a is connected to the node 100c. The node 100c is connected to the node 100e. The node 100c is connected to the node 100b. The node 100c is connected to the node 100d. The node 100e is connected to the node 100h. The node 100e is connected to the node 100f. The node 100e is connected to the node 100g. In the embodiment, the nodes 100a to 100h are integrally referred to as a node 100.

Before the node 100 sends and receives data, the node 100 selects, from among multiple communication channels with the radio frequency bandwidth, a communication channel that is used to send and receives the data in a predetermined time period called a bandwidth arbitration time period. In a predetermined time period called a data sending/receiving time period, the node 100 actually sends and receives the data by using the communication channel selected in the bandwidth arbitration time period. In a description below, the communication channel that actually sends and receives data is sometimes referred to as a use channel.

Figure 2:
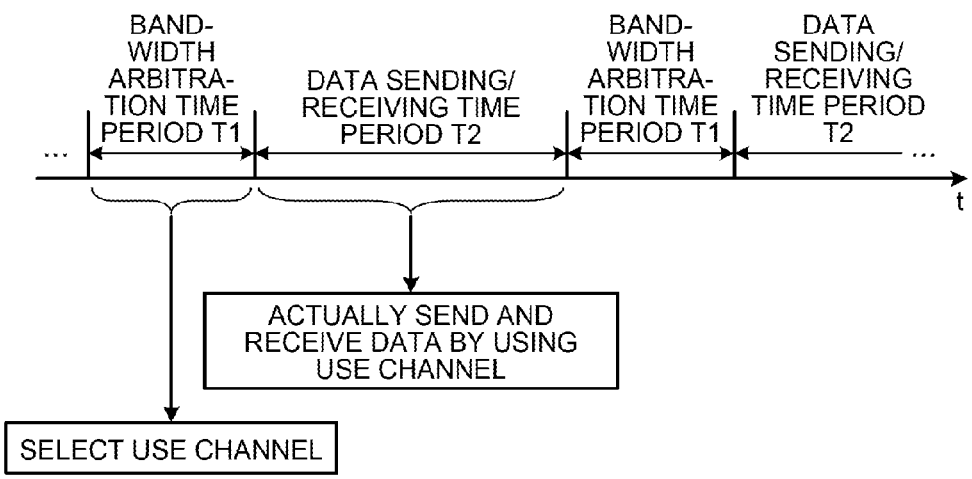
FIG. 2 is a schematic diagram illustrating the timing at which a node actually sends and receives data by using a use channel.

FIG. 2 is a schematic diagram illustrating the timing at which the node 100 actually sends and receives data by using a use channel. As illustrated in FIG. 2, in a bandwidth arbitration time period T1 that is present before a data sending/receiving time period T2, the node 100 selects a use channel from among multiple communication channels with the radio frequency bandwidth. When the bandwidth arbitration time period T1 ends, the node 100 actually sends and receives, in the data sending/receiving time period T2, data by using a use channel that was selected in the bandwidth arbitration time period T1. After the completion of the sending and receiving of the data in the data sending/receiving time period T2, the node 100 re-selects a use channel in the bandwidth arbitration time period T1. If the bandwidth arbitration time period T1 ends, the node 100 again sends and receives data in the data sending/receiving time period T2 by using a use channel selected in the bandwidth arbitration time period T1. In this way, the bandwidth arbitration time period T1 and the data sending/receiving time period T2 are periodically repeated.

Figures 3, 4:
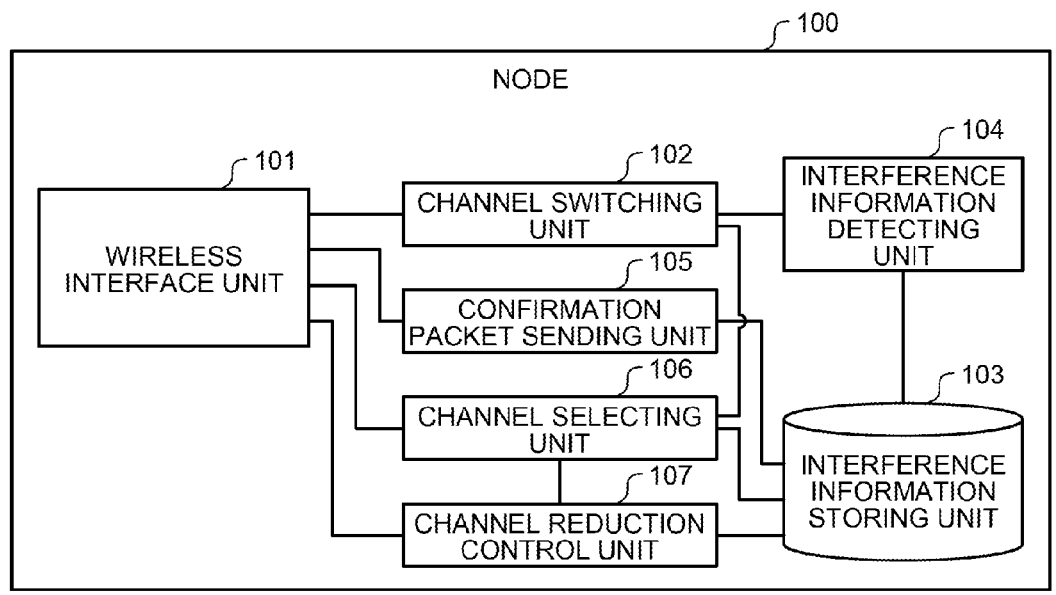
FIG. 3 is a functional block diagram illustrating the configuration of the node according to the embodiment.
FIG. 4 is a schematic diagram illustrating an example of the data structure of an interference information storing unit.

In the following, the configuration of the node 100 illustrated in FIG. 1 will be described. FIG. 3 is a functional block diagram illustrating the configuration of the node according to the embodiment. As illustrated in FIG. 3, the node 100 includes a wireless interface unit 101, a channel switching unit 102, an interference information storing unit 103, an interference information detecting unit 104, a confirmation packet sending unit 105, a channel selecting unit 106, and a channel reduction control unit 107.

The wireless interface unit 101 is a processing unit that performs wireless communication with an adjacent node. For example, the wireless interface unit 101 sends, to the adjacent node, a confirmation packet, which will be described later, received from the confirmation packet sending unit 105. Furthermore, the wireless interface unit 101 outputs the confirmation packet received from the adjacent node to the channel selecting unit 106. Furthermore, the wireless interface unit 101 sends, to the adjacent node, the confirmation packet transferred from the channel selecting unit 106. Furthermore, the wireless interface unit 101 sends, to the adjacent node, a response packet, which will be described later, that is received from the channel selecting unit 106. Furthermore, the wireless interface unit 101 sends, to the adjacent node, a channel reduction request packet, which will be described later, that is received from the channel reduction control unit 107. Furthermore, the wireless interface unit 101 outputs, to the channel reduction control unit 107, the channel reduction request packet that is received from the adjacent node.

The channel switching unit 102 is a processing unit that switches multiple communication channels with the radio frequency bandwidth. The channel switching unit 102 switches the communication channels in accordance with an instruction received from the interference information detecting unit 104. Furthermore, the channel switching unit 102 sets the use channel that was selected by the channel selecting unit 106 in the wireless interface unit 101.

The interference information storing unit 103 stores therein, for each communication channel, interference information that indicates whether the radio frequency interference from a peripheral node that is located at the periphery of its own node 100 is present. FIG. 4 is a schematic diagram illustrating an example of the data structure of an interference information storing unit. As illustrated in FIG. 4, the interference information storing unit 103 stores therein, in an associated manner, a communication channel, a peripheral node, and a received radio wave level.

From among the pieces of information stored in the interference information storing unit 103, the communication channel indicates a communication channel that can be used when data is sent and received. The peripheral node is present at the periphery of its own node 100 and stores therein the address of a node that transmits the radio wave by using a communication channel. The received radio wave level stores therein the received radio wave level of the radio wave that is transmitted from the peripheral node.

The interference flag is a flag indicating whether radio frequency interference with the communication channel has occurred due to the radio wave transmitted from a peripheral node. If radio frequency interference with the communication channel has occurred, "1" is set in the interference flag. If radio frequency interference with the communication channel does not occur, "0" is set in the interference flag. The interference flag is an example of interference information. For example, in the example illustrated in FIG. 4, because "0" is set in the interference flag that is associated to the communication channels "CH#1" and "CH#3", this indicates that the radio frequency interference with the communication channels "CH#1" and "CH#3" does not occur. Furthermore, in the example illustrated in FIG. 4, because "1" is set in the interference flag that is associated with the communication channel "CH#2", this indicates that the radio frequency interference with the communication channel "CH#2" has occurred.

A description will be given here by referring back to FIG. 3. While switching the multiple communication channels that can be used to send and receive data, the interference information detecting unit 104 detects, for each communication channel, interference information that indicates whether radio frequency interference with a peripheral node is present.

In the following, a description will be given of an example of a process in which the interference information detecting unit 104 detects interference information for each communication channel. First, the interference information detecting unit 104 switches the communication channels and measures the received radio wave level of the radio wave that is transmitted from a peripheral node. Specifically, the interference information detecting unit 104 controls the channel switching unit 102, sets a communication channel as an initial channel, and measures the received radio wave level of the set communication channel. The interference information detecting unit 104 determines whether the measured received radio wave level is equal to or greater than a threshold. If the measured received radio wave level is equal to or greater than the threshold, the interference information detecting unit 104 acquires the address of the node that transmits the radio wave by using the current communication channel and then stores the acquired address in the interference information storing unit 103 in a peripheral node. The interference information detecting unit 104 stores the measured received radio wave level in the received radio wave level in the interference information storing unit 103. Then, the interference information detecting unit 104 controls the channel switching unit 102, sequentially switches the communication channels, measures the received radio wave level of the switched communication channel. The interference information detecting unit 104 repeatedly performs the series of operation of storing the measured received radio wave level until all of the communication channels are measured.

Subsequently, on the basis of the measured received radio wave level, the interference information detecting unit 104 detects interference information. Specifically, the interference information detecting unit 104 refers to the top record related to the communication channel in the interference information storing unit 103. The interference information detecting unit 104 determines whether the received radio wave level that is equal to or greater than the threshold is present in the record that was referred to. If the received radio wave level that is equal to or greater than the threshold is present in the record that was referred to, the interference information detecting unit 104 sets the interference flag of the record, which was referred to, to "1" indicating that radio frequency interference has occurred. In contrast, if the received radio wave level that is equal to or greater than the threshold is not present in the record that was referred to, the interference information detecting unit 104 sets the interference flag of the record, which was referred to, to "0" indicating that radio frequency interference does not occur. The interference information detecting unit 104 refers to the record on the subsequent communication channel stored in the interference information detecting unit 104 and repeatedly performs the series of the operation of setting an interference flag for the record that was referred to by the number of times corresponding to the records of all of the channels, whereby the interference information detecting unit 104 detects, for each communication channel, an interference flag that is used as the interference information.

Before sending and receiving data, for each node that is included in a communication path from its own node 100 to the destination node that is the destination of the data, the confirmation packet sending unit 105 creates a confirmation packet that is used to confirm whether radio frequency interference is present. Specifically, the confirmation packet sending unit 105 creates a confirmation packet that sequentially stores therein, for each node, interference information that is detected by the interference information detecting unit 104. The confirmation packet sending unit 105 sends the confirmation packet to the destination node.

In the following, a description will be given of an example of the data structure of a confirmation packet created by the confirmation packet sending unit 105. FIG. 5 is a schematic diagram illustrating an example of the data structure of a confirmation packet according to the embodiment. As illustrated in FIG. 5, the confirmation packet includes the destination, the send source, and the interference information on the nodes 100a to 100n.

From among items included in the confirmation packet, the destination stores therein the address of the destination node. For example, the confirmation packet sending unit 105 retains an address table of the nodes 100a to 100h, uses the address table, and sets the destination to the address of the destination node. The send source stores therein the address of the node 100 that is the send source of the confirmation packet.

In the interference information on the node 100a, the interference information detected by the interference information detecting unit 104 in the node 100a is stored. In the interference information on the node 100c, the interference information detected by the interference information detecting unit 104 in the node 100c is stored. In the interference information on the node 100e, the interference information detected by the interference information detecting unit 104 in the node 100e is stored.

Furthermore, for the interference information on the nodes 100a to 100n illustrated in FIG. 5, the pieces of the information are sequentially added in the order of the node 100a, the node 100c, the node 100e, . . . , and the node 100n every time a confirmation packet is transferred. In other words, in the confirmation packet that is created by the confirmation packet sending unit 105 in the node 100a, only the interference information on the node 100a is stored. For the pieces of the interference information on the nodes 100c to 100n, the pieces of the information are sequentially added in the order of the node 100c, the node 100e, . . . , and the node 100n every time a confirmation packet is transferred.

In the following, a description will be given of an example of the data structure of the interference information on the node 100a that is stored in the confirmation packet created by the confirmation packet sending unit 105 in the node 100a. FIG. 6 is a schematic diagram illustrating an example of the data structure of interference information on a node that is stored in the confirmation packet. As illustrated in FIG. 6, in the interference information on the node 100a, an interference flag is stored for each communication channel.

The communication channel indicates a communication channel that can be used when data is sent and received. The interference flag is a flag that indicates whether radio frequency interference with a communication channel has occurred. If radio frequency interference with a communication channel has occurred, "1" is set in the interference flag. If radio frequency interference with a communication channel does not occur, "0" is set in the interference flag.

A description will be given here by referring back to FIG. 3. For example, every time a trigger that indicates data transmission occurs and the time reaches the bandwidth arbitration time period, the confirmation packet sending unit 105 creates a confirmation packet and then sends the created confirmation packet.

In the following, a description will be given of an example of a process in which the confirmation packet sending unit 105 creates and sends a confirmation packet. When a trigger that indicates data transmission has occurred, the confirmation packet sending unit 105 refers to the interference information storing unit 103, extracts a value of the interference flag for each communication channel, and sets the value in the interference information in the confirmation packet. The confirmation packet sending unit 105 stores the address of the destination node in the destination in the confirmation packet. The confirmation packet sending unit 105 stores the address of its own node 100 in the send source in the confirmation packet. The confirmation packet sending unit 105 sends the confirmation packet via the wireless interface unit 101.

The channel selecting unit 106 receives the confirmation packet from an adjacent node and determines whether its own node 100 corresponds to the destination of the confirmation packet. If its own node 100 does not correspond to the destination of the confirmation packet, the channel selecting unit 106 transfers, to the other node, the confirmation packet in which the interference information stored in the interference information storing unit 103 is additionally stored. If its own node 100 corresponds to the destination of the confirmation packet, on the basis on the pieces of the interference information that are sequentially stored in the confirmation packet for each node and on the basis of the interference information stored in the interference information storing unit 103, the channel selecting unit 106 selects a use channel that is used to send and receive data. The channel selecting unit 106 outputs the selected use channel to the channel switching unit 102.

In the following, a description will be given of an example of a process in which the channel selecting unit 106 transfers a confirmation packet. The channel selecting unit 106 newly creates a record on interference information in the confirmation packet. The channel selecting unit 106 refers to the interference information storing unit 103, extracts a value of the interference flag for each communication channel, and additionally stores the extracted value of the interference flag for each communication channel in the newly created interference information that is stored in the confirmation packet. The channel selecting unit 106 transfers, via the wireless interface unit 101, the confirmation packet in which the value of the interference flag is additionally stored.

Figure 7:
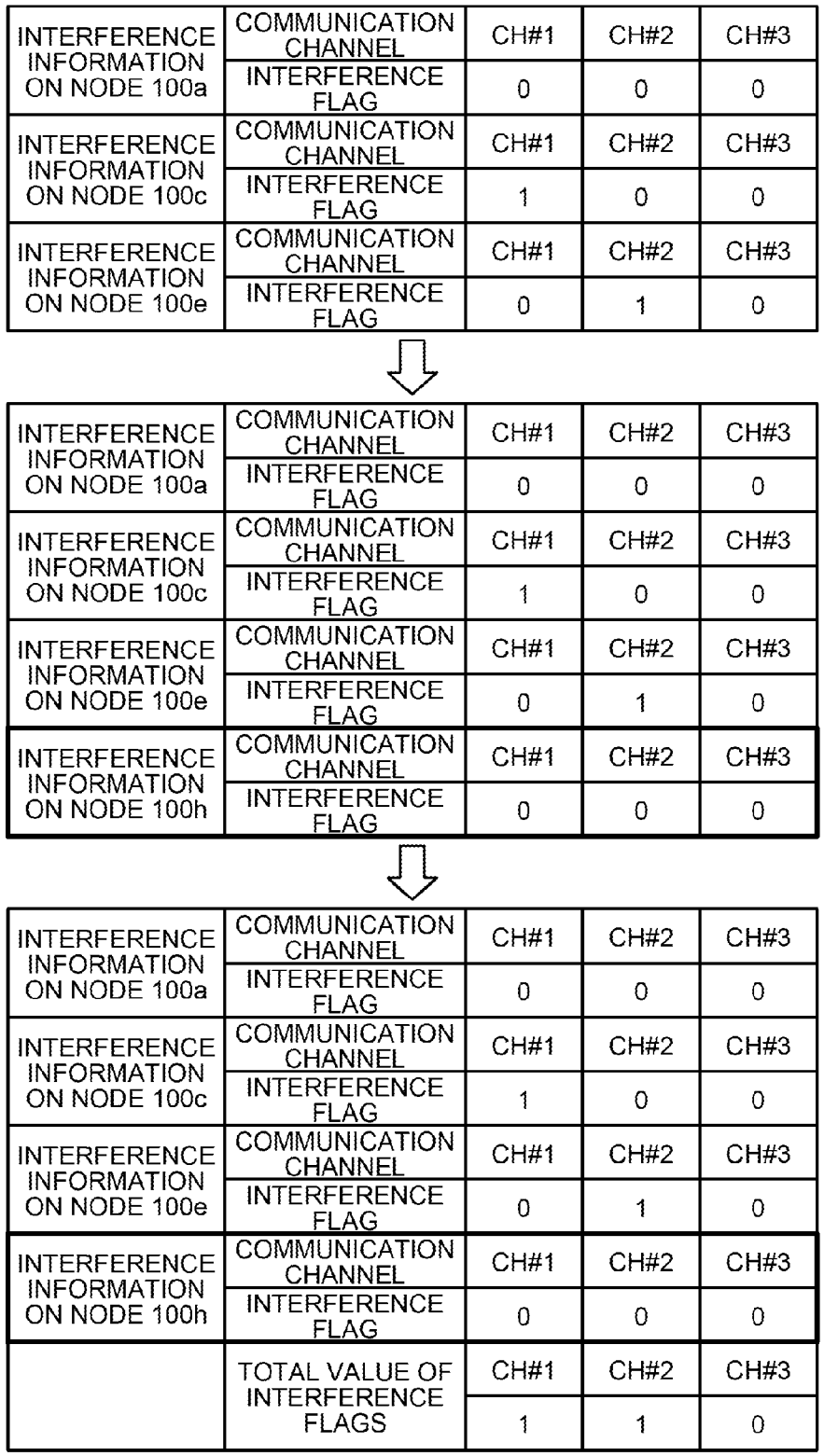
FIG. 7 is a schematic diagram illustrating an example of a process performed by a channel selecting unit according to the embodiment.

In the following, a description will be given of an example of a process in which the channel selecting unit 106 selects a use channel. FIG. 7 is a schematic diagram illustrating an example of a process performed by a channel selecting unit according to the embodiment. In the example illustrated in FIG. 7, it is assumed that the channel selecting unit 106 determines that its own node 100h corresponds to the destination of the confirmation packet. The channel selecting unit 106 extracts all pieces of the interference information that are included in the confirmation packet. For example, as illustrated in the upper portion of FIG. 7, the channel selecting unit 106 extracts the interference information on the nodes 100a to 100e included in the confirmation packet.

Then, the channel selecting unit 106 refers to the interference information storing unit 103, extracts the values of the interference flag for communication channels and then adds the extracted values of the interference flag, as the interference information on its own node 100, to all pieces of the interference information extracted from the confirmation packet. For example, as illustrated in the middle portion of FIG. 7, the channel selecting unit 106 adds, as the interference information on its own node 100$h$, the values of the interference flag for communication channels extracted from the interference information storing unit 103 to the interference information on the nodes 100*a* to 100*e* extracted from the confirmation packet.

Subsequently, the channel selecting unit 106 calculates the total value of the interference flag for the communication channels on the basis of the information that is obtained by adding the interference information on its own node 100 to all of the pieces of the interference information extracted from the confirmation packet. For example, as illustrated in the lower portion of FIG. 7, the channel selecting unit 106 calculates the total value "1" of the interference flag related to the communication channel "CH#1", calculates the total value "1" of the interference flag related to the communication channel "CH#2", and calculates the total value "0" of the interference flag related to the communication channel "CH#3".

Then, the channel selecting unit 106 specifies the communication channel with the smallest total value of the interference flag and selects the specified communication channel as a use channel. It is assumed that the "communication channel with the smallest total value of the interference flag" mentioned here includes the communication channel that has the total value of the interference flag of "0". In the example illustrated in FIG. 7, the total value of the interference flag related to the communication channel "CH#3" is the smallest. Accordingly, the channel selecting unit 106 specifies the communication channel "CH#3" as the communication channel that has the smallest total value of the interference flag and then selects the specified communication channel "CH#3" as a use channel.

If the channel selecting unit 106 is not able to specify a communication channel that has the smallest total value of the interference flag, in other words, if the total value of the interference flag for the communication channels is other than "0" and the values are all the same, the channel selecting unit 106 selects an arbitrary communication channel as a use channel.

Furthermore, if the channel selecting unit 106 selects a use channel, the channel selecting unit 106 creates a response packet that includes therein the selected use channel and sends the response packet to the node that is the send source of the confirmation packet.

Figure 8:
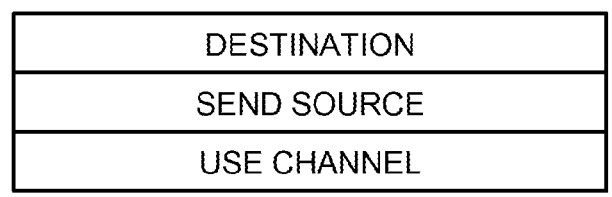
FIG. 8 is a schematic diagram illustrating an example of the data structure of a response packet according to the embodiment.

In the following, a description will be given of the data structure of a response packet created by the channel selecting unit 106. FIG. 8 is a schematic diagram illustrating an example of the data structure of a response packet according to the embodiment. As illustrated in FIG. 8, the response packet includes therein the destination, the send source, and the use channel. The destination stores therein the address of the node that is the send source of the confirmation packet. The send source stores therein the address of its own node 100 that corresponds to the send source of the response packet. The use channel stores therein the use channel selected by the channel selecting unit 106.

Furthermore, if the channel selecting unit 106 receives a response packet from the other node, the channel selecting unit 106 outputs the use channel included in the response packet to the channel switching unit 102. Then, the use channel that has been output to the channel switching unit 102 is set in the wireless interface unit 101, whereby the node 100 decides to actually send data by using the use channel.

The channel reduction control unit 107 receives the response packet from the other node. The channel reduction control unit 107 specifies an interference node that transmits a radio wave that is equal to or greater than the threshold from the peripheral node that sends and receives data by using the use channel stored in the response packet. The channel reduction control unit 107 creates and sends a channel reduction request packet that requests the specified interference node to stop the sending of the data by using the use channel.

Figure 9:
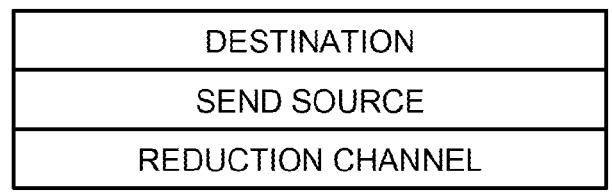
FIG. 9 is a schematic diagram illustrating an example of the data structure of a channel reduction request packet according to the embodiment.

In the following, a description will be given of an example of the data structure of a channel reduction request packet created by the channel reduction control unit 107. FIG. 9 is a schematic diagram illustrating an example of the data structure of a channel reduction request packet according to the embodiment. As illustrated in FIG. 9, the channel reduction request packet includes therein the destination, the send source, and the reduction channel. The destination stores therein the address of an interference node. The send source stores therein the address of its own node 100 that is the send source of a channel reduction request packet. The reduction channel stores therein a use channel that is stored in a response packet.

In the following, a description will be given of an example of a process in which the channel reduction control unit 107 creates and sends a channel reduction request packet. When the channel reduction control unit 107 receives a response packet, the channel reduction control unit 107 refers to the interference information storing unit 103 and determines whether an interference node can be specified from a peripheral node that is associated with the use channel stored in the response packet. If the channel reduction control unit 107 can specify an interference node, i.e., a node that transmits the radio wave that is equal to or greater than the threshold, the channel reduction control unit 107 sets the use channel in a reduction channel in a channel reduction request packet. The channel reduction control unit 107 sends the channel reduction request packet to the specified interference node.

If the channel reduction control unit 107 is not able to specify an interference node, i.e., a node that transmits the radio wave that is equal to or greater than the threshold, the channel reduction control unit 107 does not create a channel reduction request packet.

Furthermore, the channel reduction control unit 107 receives a channel reduction request packet from the other node. Then, the channel reduction control unit 107 determines whether its own node 100 sends data by using a reduction channel stored in the channel reduction request packet, i.e., a use channel. If the channel reduction control unit 107 sends data by using the use channel and sends data by using another communication channel that is other than the use channel, the channel reduction control unit 107 stops to send the data that is performed by using the use channel. For example, by instructing the channel selecting unit 106 to invalidate the use channel that is output from the channel selecting unit 106 to the channel switching unit 102, the channel reduction control unit 107 stops to send the data that is performed by using the use channel.

In contrast, if the node 100 itself does not send data by using the use channel, the channel reduction control unit 107 transfers the channel reduction request packet to the other node that corresponds to the send source of the data.

The wireless interface unit 101 described above corresponds to, for example, a radio link module.

Furthermore, the channel switching unit 102, the interference information detecting unit 104, and the confirmation packet sending unit 105 described above correspond to, for example, an integrated circuit, such as an application specific integrated circuit (ASIC), a field programmable gate array (FPGA), or the like. Furthermore, the channel selecting unit 106 and the channel reduction control unit 107 correspond to, for example, an integrated circuit, such as an ASIC, an FPGA, or the like. Furthermore, the channel switching unit 102, the interference information detecting unit 104, and the confirmation packet sending unit 105 described above correspond to, for example, an electronic circuit, such as a central processing unit (CPU), a micro processing unit (MPU), or the like. Furthermore, the channel selecting unit 106 and the channel reduction control unit 107 correspond to, for example, an electronic circuit, such as a CPU, an MPU, or the like.

Furthermore, the interference information storing unit 103 described above corresponds to, for example, a semiconductor memory device, such as a random access memory (RAM), a read only memory (ROM), a flash memory, and the like or a storage device, such as a hard disk, an optical disk, and the like.

Figure 10:
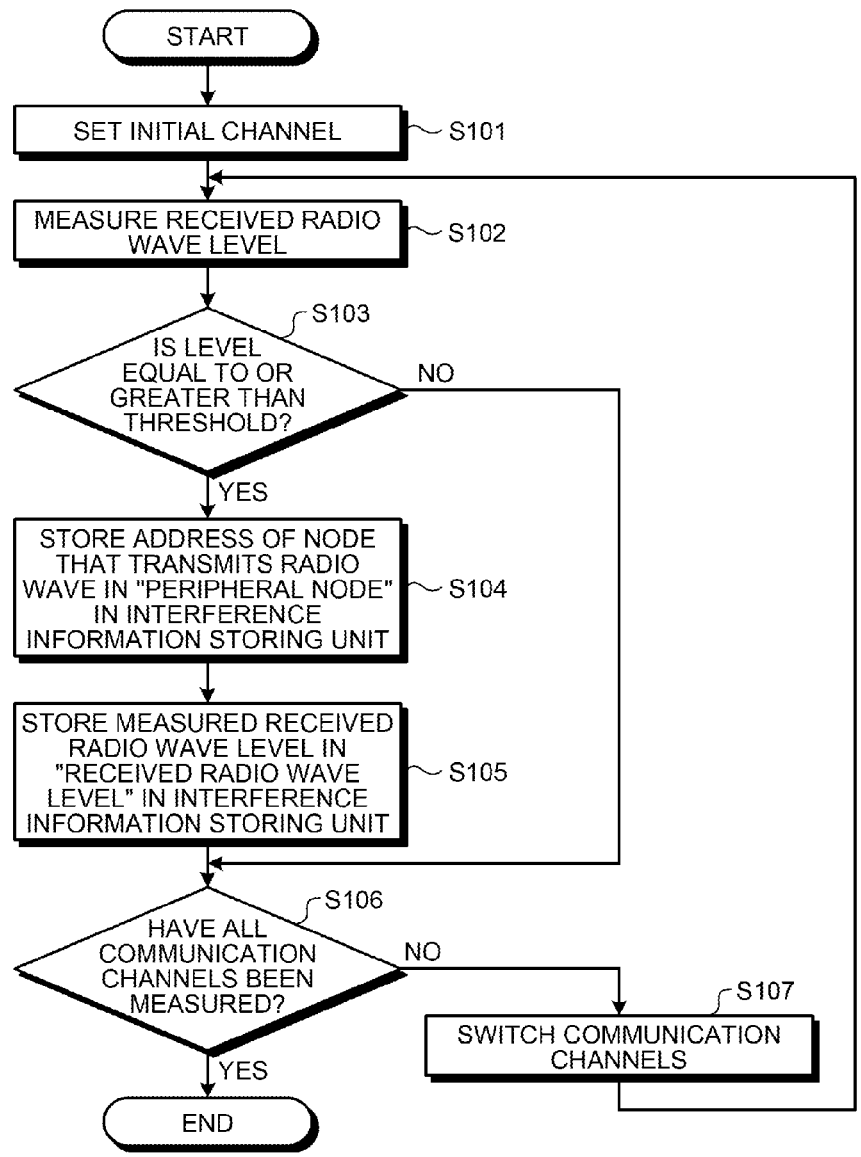
FIG. 10 is a flowchart illustrating the flow of a process in which the node according to the embodiment measures a received radio wave level.

In the following, a description will be given of the flow of a process performed by the node 100 according to the embodiment. FIG. 10 is a flowchart illustrating the flow of a process in which the node according to the embodiment measures a received radio wave level. The process illustrated in FIG. 10 is performed in, for example, a predetermined time period.

As illustrated in FIG. 10, the node 100 sets a communication channel to the initial channel (Step S101) and measures a received radio wave level (Step S102). If the measured received radio wave level is smaller than the threshold (No at Step S103), the node 100 proceeds to Step S106.

In contrast, if the measured received radio wave level is equal to or greater than the threshold (Yes at Step S103), the node 100 acquires the address of the node that transmits the radio wave using the current communication channel and then stores the acquired address in the peripheral node in the interference information storing unit 103 (Step S104). The node 100 stores the measured received radio wave level in the received radio wave level in the interference information storing unit 103 (Step S105).

If the node 100 has not measured all of the communication channels (No at Step S106), the node 100 switches the communication channels (Step S107) and returns the process to Step S102. In contrast, if the node 100 has measured all of the communication channels (Yes at Step S106), the node 100 ends the process.

Figure 11:
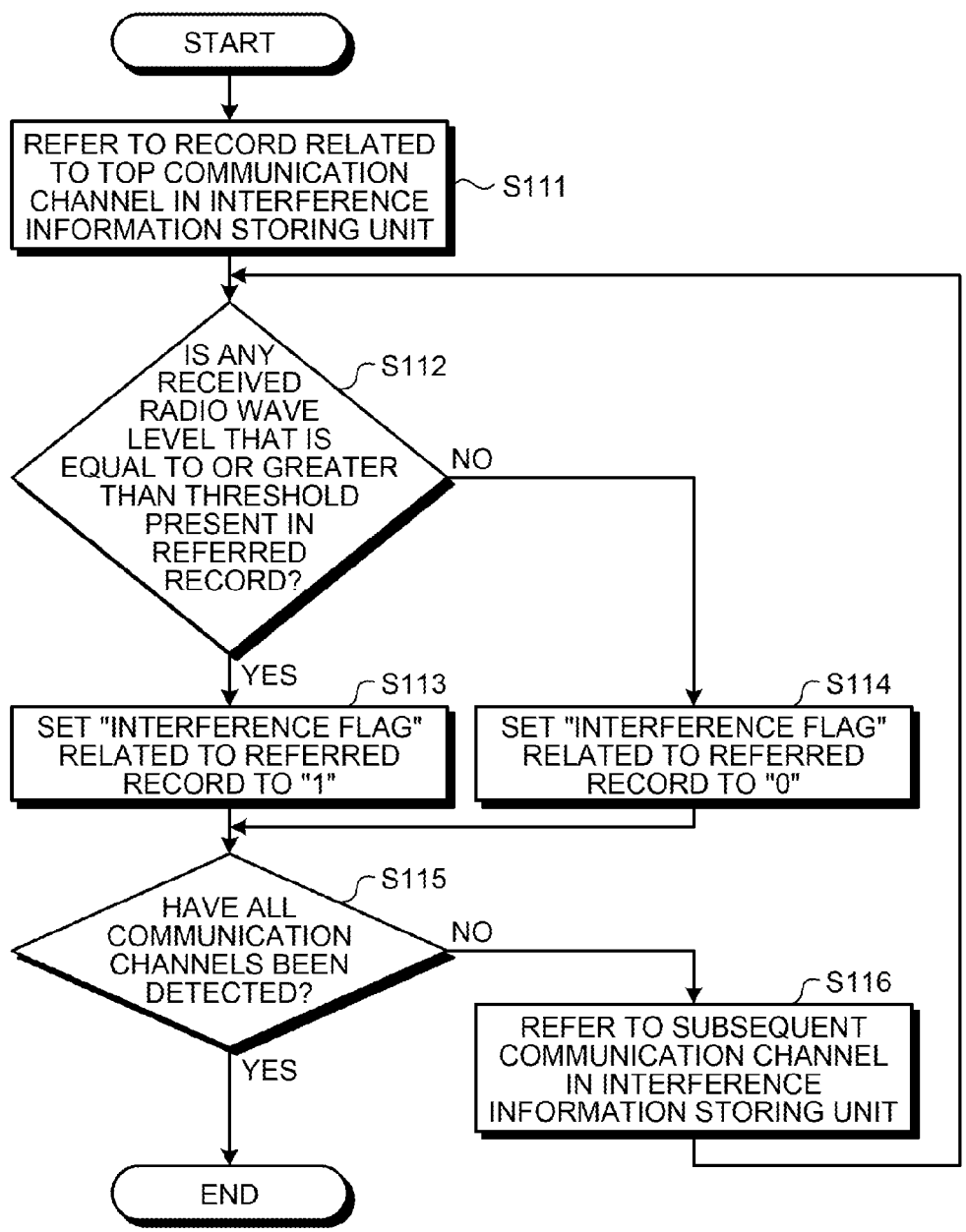
FIG. 11 is a flowchart illustrating the flow of a process in which the node according to the embodiment detects interference information.

In the following, a description will be given of a process in which the node 100 according to the embodiment detects interference information. FIG. 11 is a flowchart illustrating the flow of a process in which the node according to the embodiment detects interference information. The process illustrated in FIG. 11 is performed, for example, after the completion of the process illustrated in FIG. 10.

As illustrated in FIG. 11, the node 100 refers to the record related to the top communication channel in the interference information storing unit 103 (Step S111). The node 100 determines whether a received radio wave level that is equal to or greater than the threshold is present in the record that was referred to (Step S112). If a received radio wave level that is equal to or greater than the threshold is present in the record that was referred to (Yes Step S112), the node 100 sets the interference flag related to the record, which was referred to, to "1", indicating that radio frequency interference occurs (Step S113).

In contrast, if a received radio wave level that is equal to or greater than the threshold is not present in the record that was referred to (No Step S112), the node 100 sets the interference flag related to the record, which was referred to, to "0", indicating that radio frequency interference does not occur (Step S114).

If the node 100 has not detected the record related to all of the communication channels in the interference information storing unit 103 (No at Step S115), the node 100 refers to the record related to the subsequent communication channel in the interference information storing unit 103 (Step S116) and then returns the process to Step S112. In contrast, if the node 100 has detected the record related to all of the communication channels in the interference information storing unit 103 (Yes at Step S115), the node 100 ends the process.

Figure 12:
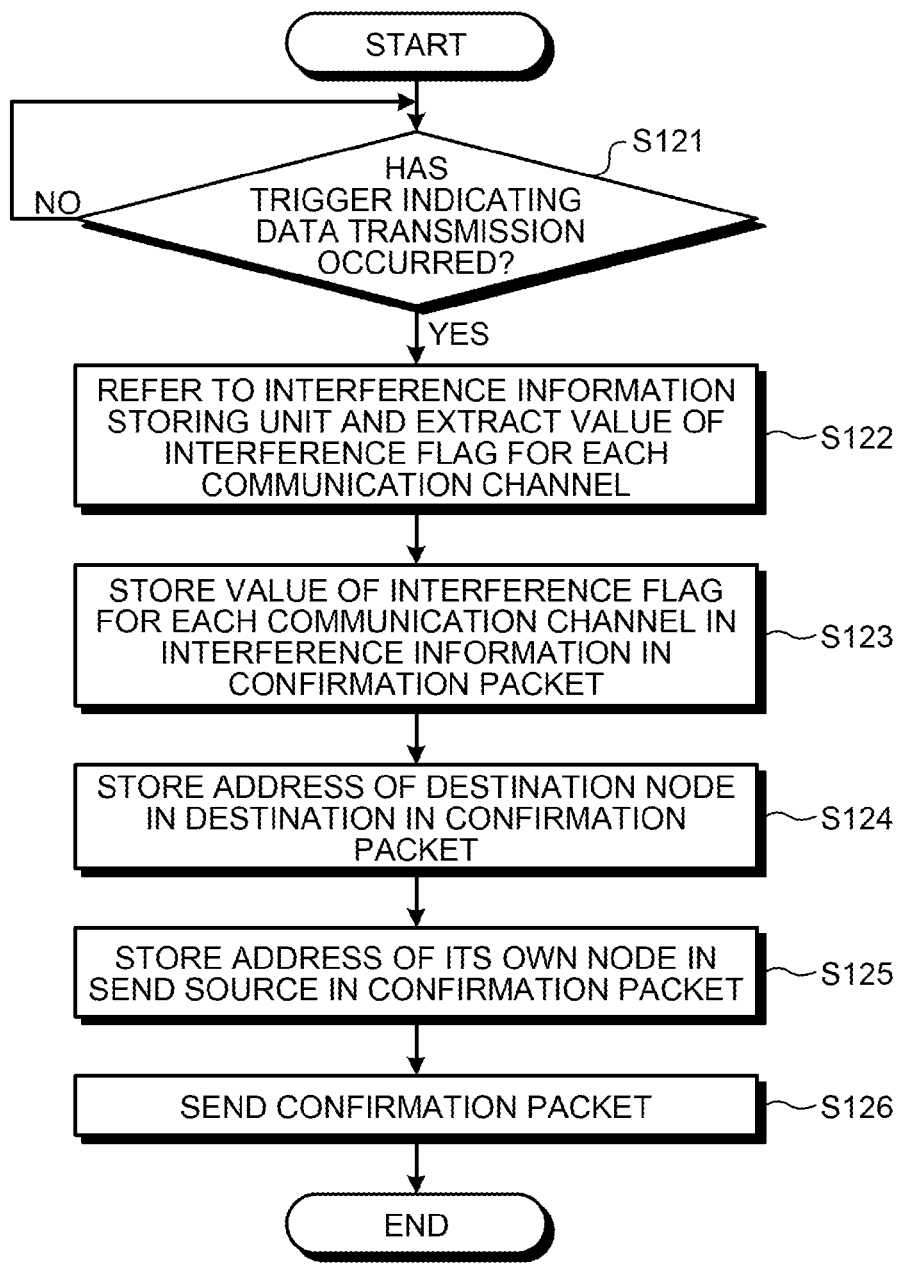
FIG. 12 is a flowchart illustrating the flow of a process in which the node according to the embodiment sends a confirmation packet.

In the following, a description will be given of a process in which the node 100 according to the embodiment sends a confirmation packet. FIG. 12 is a flowchart illustrating the flow of a process in which the node according to the embodiment sends a confirmation packet. The process illustrated in FIG. 12 is performed when a trigger indicating data transmission has occurred.

As illustrated in FIG. 12, if a trigger indicating data transmission has not occurred (No at Step S121), the node 100 proceeds to Step S121 again. In contrast, if a trigger indicating data transmission has occurred (Yes at Step S121), the node 100 refers to the interference information storing unit 103, extracts the values of the interference flag for the communication channels (Step S122), and then sets the values in the pieces of the interference information in the confirmation packet (Step S123).

The node 100 stores the address of the destination node in the destination in the confirmation packet (Step S124) and stores the address of its own node 100 in the send source in the confirmation packet (Step S125). The node 100 sends the confirmation packet (Step S126).

Figure 13:
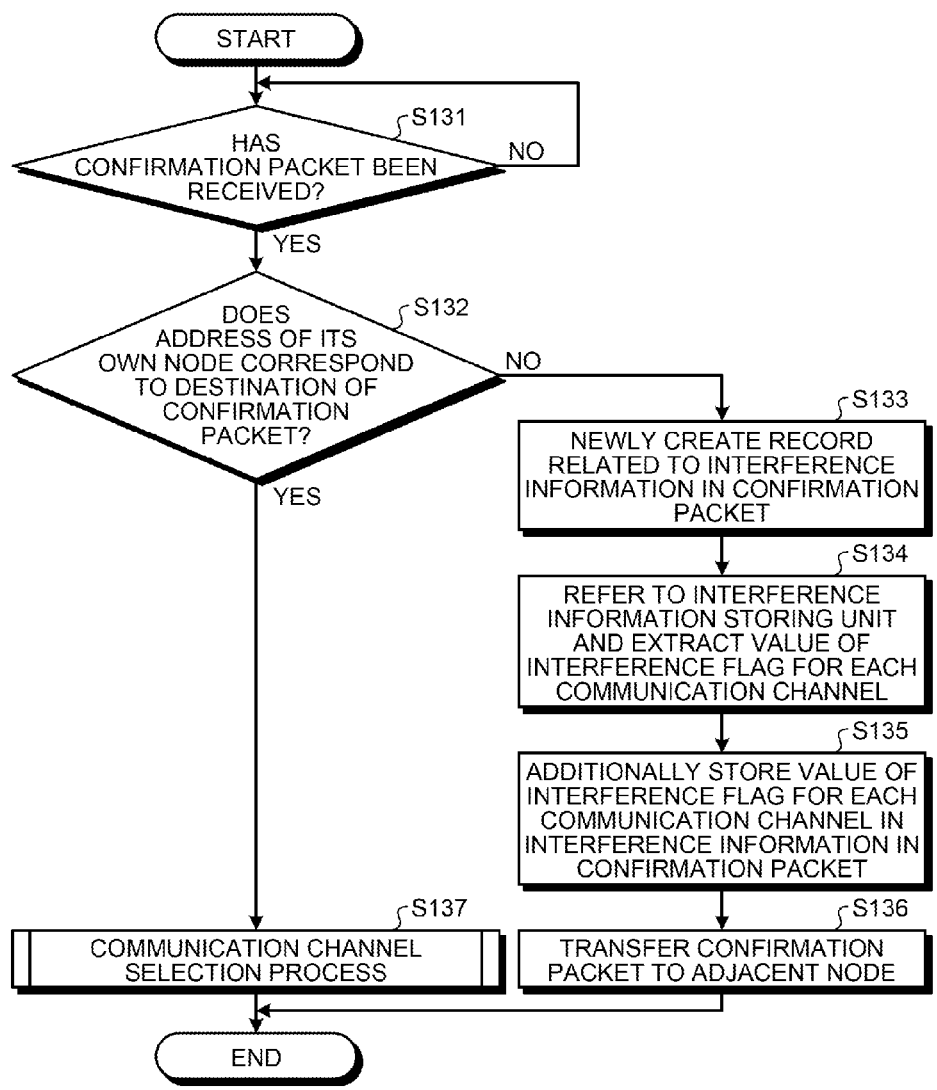
FIG. 13 is a flowchart illustrating the flow of a process in which the node according to the embodiment selects a use channel.

In the following, a description will be given of a process in which the node 100 according to the embodiment selects a use channel. FIG. 13 is a flowchart illustrating the flow of a process in which the node according to the embodiment selects a use channel. The process illustrated in FIG. 13 is performed when a confirmation packet is received.

As illustrated in FIG. 13, if the node 100 has not received a confirmation packet (No at Step S131), the node 100 proceeds to Step S131 again. In contrast, if the node 100 has received a confirmation packet (Yes at Step S131), the node 100 determines whether its own node 100 corresponds to the destination of the confirmation packet (Step S132).

If its own node 100 does not correspond to the destination of the confirmation packet (No at Step S132), the node 100 newly creates a record related to the interference information in the confirmation packet (Step S133). The node 100 refers to the interference information storing unit 103 and extracts the values of the interference flag for communication channels (Step S134). The node 100 additionally stores the extracted values of the interference flag for the communication channels in the newly created interference information in the confirmation packet (Step S135). The node 100 transfers the confirmation packet to the adjacent node (Step S136).

In contrast, if its own node 100 corresponds to the destination of the confirmation packet (Yes at Step S132), the node 100 performs the communication channel selection process (Step S137).

Figure 14:
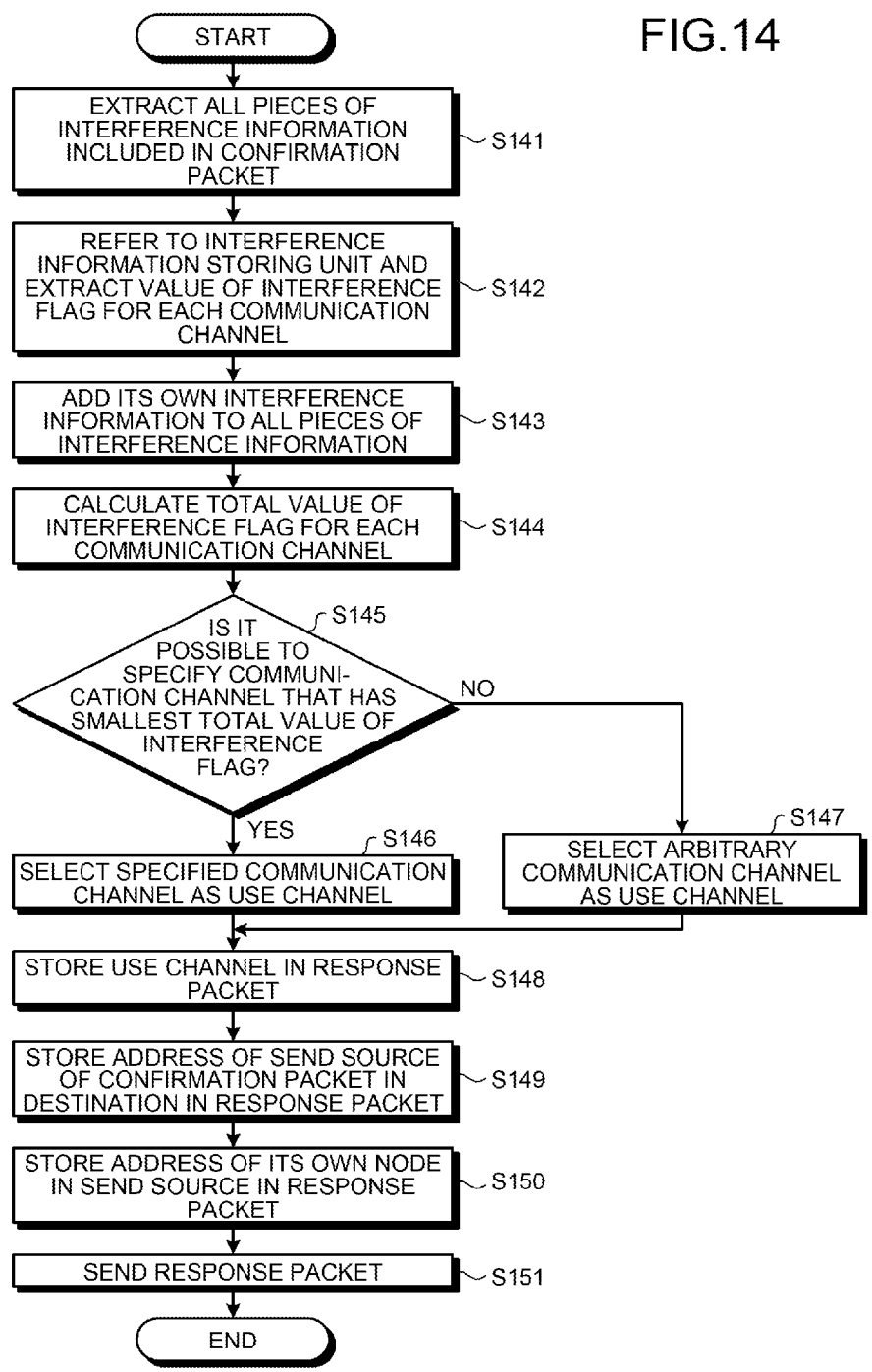
FIG. 14 is a flowchart illustrating the flow of a communication channel selection process according to the embodiment.

In the following, a description will be given of the flow of the communication channel selection process performed at Step S137 illustrated in FIG. 13. FIG. 14 is a flowchart illustrating the flow of a communication channel selection process according to the embodiment.

As illustrated in FIG. 14, the node 100 extracts all pieces of the interference information included in the confirmation packet (Step S141). The node 100 refers to the interference information storing unit 103, extracts the values of the interference flag for the communication channels (Step S142) and then adds the values of the extracted interference flag as the interference information on its own node 100 to all pieces of the interference information extracted from the confirmation packet (Step S143).

On the basis of the information that is obtained by adding the interference information on its own node 100 to all of the pieces of the interference information extracted from the confirmation packet, the node 100 calculates the total values of the interference flag for each communication channels (Step S144). The node 100 determines whether to specify the communication channel that has the smallest total value of the interference flag (Step S145).

If the node 100 can specify the communication channel that has the smallest total value of the interference flag (Yes at Step S145), the node 100 selects the specified communication channel as a use channel (Step S146). In contrast, if the node 100 is not able to specify the communication channel that has the smallest total value of the interference flag (No at Step S145), the node 100 selects an arbitrary communication channel as a use channel (Step S147).

If an arbitrary communication channel is selected as a use channel, it is conceivable that radio frequency interference may temporarily occur in a communication channel (hereinafter, referred to as an "overlapped channel") that overlaps with the use channel from among multiple communication channels that have the same total value of the interference flag. However, even if the radio frequency interference temporarily occurs in the current bandwidth arbitration time period, data transmission that uses the overlapped channel may possible be stopped in the subsequent bandwidth arbitration time period. In such a case, the radio frequency interference that has occurred in the overlapped channel is canceled in the subsequent bandwidth arbitration time period and the total value of the interference flag for the use channel becomes the minimum. Consequently, in the subsequent bandwidth arbitration time period, the node 100 can select a communication channel that has the minimum total value of the interference flag, i.e., an appropriate communication channel in which the effect of the radio frequency interference is the smallest, as a use channel (Step S146 described above).

The node 100 stores the use channel selected at Step S146 or Step S147 in the use channel in a response packet (Step S148). The node 100 stores, in the destination in the response packet, the address of the send source stored in the confirmation packet (Step S149) and then stores the address of its own node 100 in the send source in the response packet (Step S150). The node 100 sends the response packet (Step S151).

Figure 15:
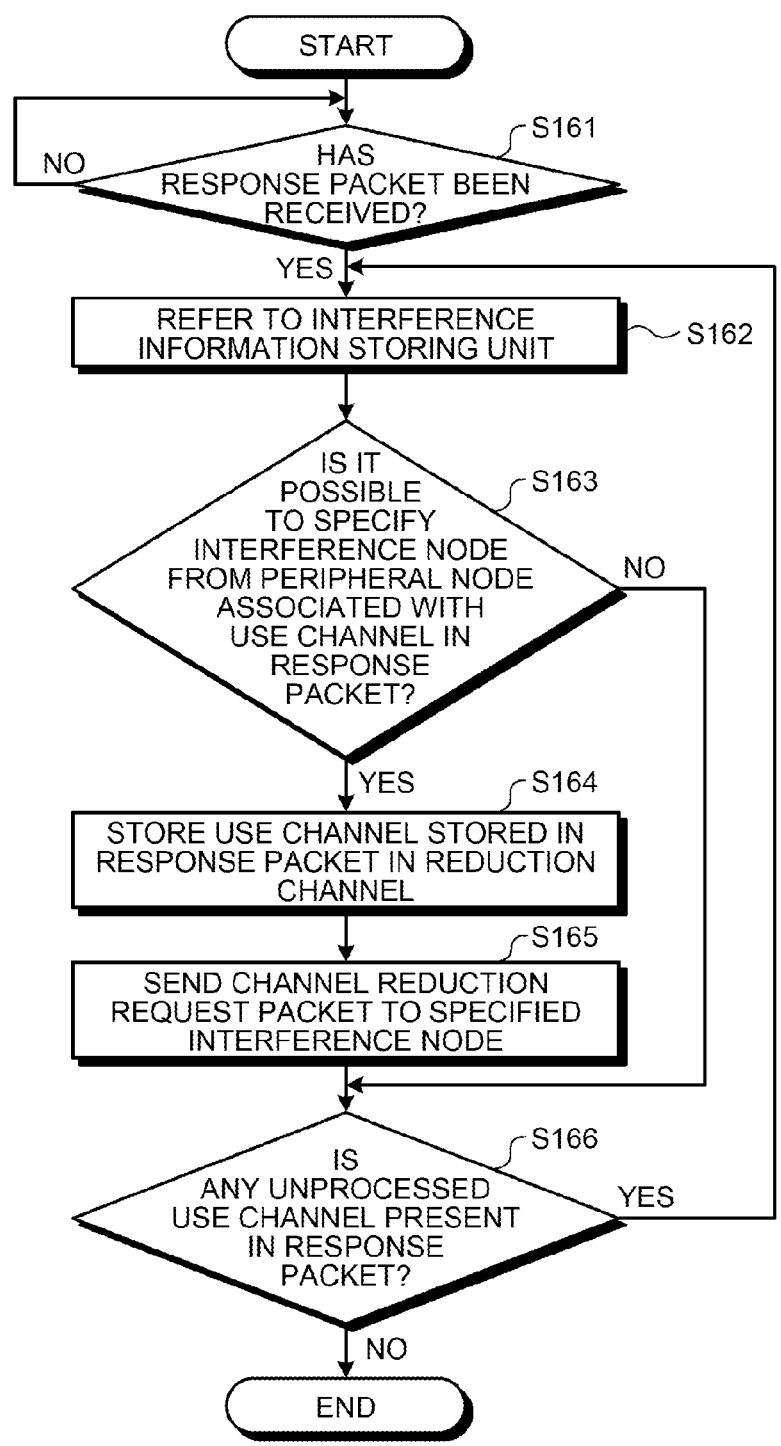
FIG. 15 is a flowchart illustrating the flow of a process in which the node according to the embodiment sends a channel reduction request packet.

In the following, a description will be given of a process in which the node 100 according to the embodiment sends a channel reduction request packet. FIG. 15 is a flowchart illustrating the flow of a process in which the node according to the embodiment sends a channel reduction request packet. The process illustrated in FIG. 15 is performed when a response packet is received.

As illustrated in FIG. 15, if the node 100 has not received a response packet (No at Step S161), the node 100 proceeds to Step S161 again. If the node 100 has received a response packet (Yes at Step S161), the node 100 refers to the interference information storing unit 103 (Step S162) and determines whether to specify an interference node from among the peripheral nodes that are associated with the use channel in the response packet (Step S163).

If the node 100 can specify an interference node (Yes at Step S163), the node 100 sets the use channel stored in the response packet to the reduction channel stored in the channel reduction request packet (Step S164). The node 100 sends the channel reduction request packet to the specified interference node (Step S165).

In contrast, if the node 100 is not able to specify an interference node (No at Step S163), the node 100 proceeds to Step S166 without creating a channel reduction request packet.

If any unprocessed use channel is present in the response packet (Yes at Step S166), the node 100 returns the process to Step S162. In contrast, if an unprocessed use channel is not present in the response packet (No at Step S166), the node 100 ends the process.

Figure 16:
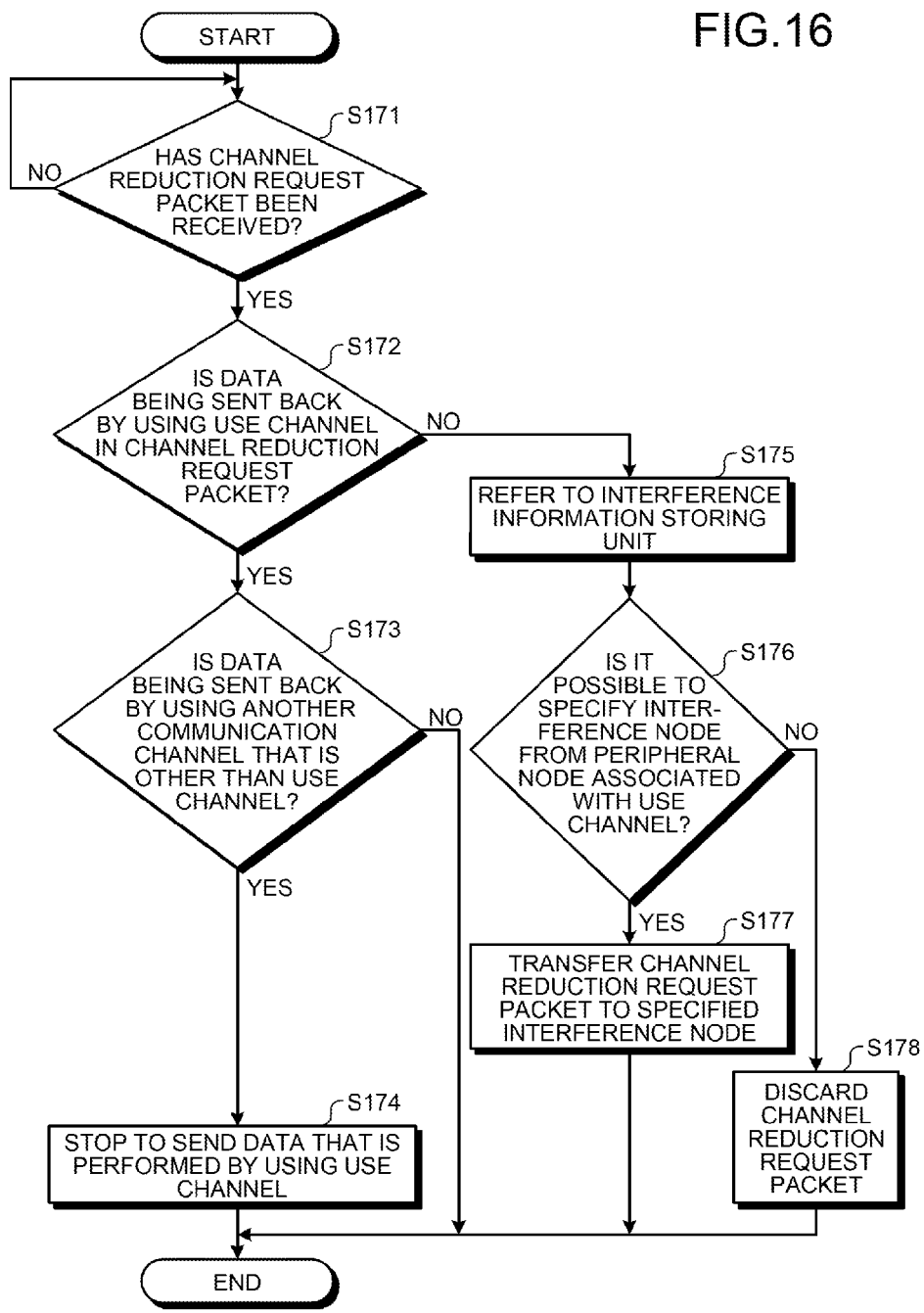
FIG. 16 is a flowchart illustrating the flow of a process performed when the node according to the embodiment receives the channel reduction request packet.

In the following, a description will be given of the flow of a process in which node 100 according to the embodiment receives a channel reduction request packet. FIG. 16 is a flowchart illustrating the flow of a process performed when the node according to the embodiment receives the channel reduction request packet. The process illustrated in FIG. 16 is performed when a channel reduction request packet is received.

As illustrated in FIG. 16, if the node 100 has not received a channel reduction request packet (No at Step S171), the node 100 proceeds to Step S171 again. If the node 100 has received a channel reduction request packet (Yes at Step S171), the node 100 determines whether the node 100 is sending data by using a reduction channel that is stored in the channel reduction request packet, i.e., by using a use channel (Step S172).

If the node 100 is sending data by using the use channel (Yes at Step S172), the node 100 determines whether the node 100 is sending data by using another communication channel that is other than the use channel (Step S173). If the node 100 is sending data by using another communication channel that is other than the use channel (Yes at Step S173), the node 100 stops to send the data that is performed by using the use channel (Step S174). In contrast, if the node 100 is sending the data by using only the use channel (No at Step S173), the node 100 continues to send the data by using the use channel and then ends the process.

In contrast, if the node 100 is not sending data by using the use channel (No at Step S172), the node 100 refers to the interference information storing unit 103 (Step S175). The node 100 determines whether an interference node can be specified from a peripheral node that is associated with the use channel (Step S176). If the node 100 can specify an interference node (Yes at Step S176), the node 100 transfers a channel reduction request packet to the specified interference node, i.e., the other node that corresponds to the send source of the data (Step S177). In contrast, if the node 100 is not able to specify an interference node (No at Step S176), the node 100 discards the channel reduction request packet (Step S178).

Figure 17:
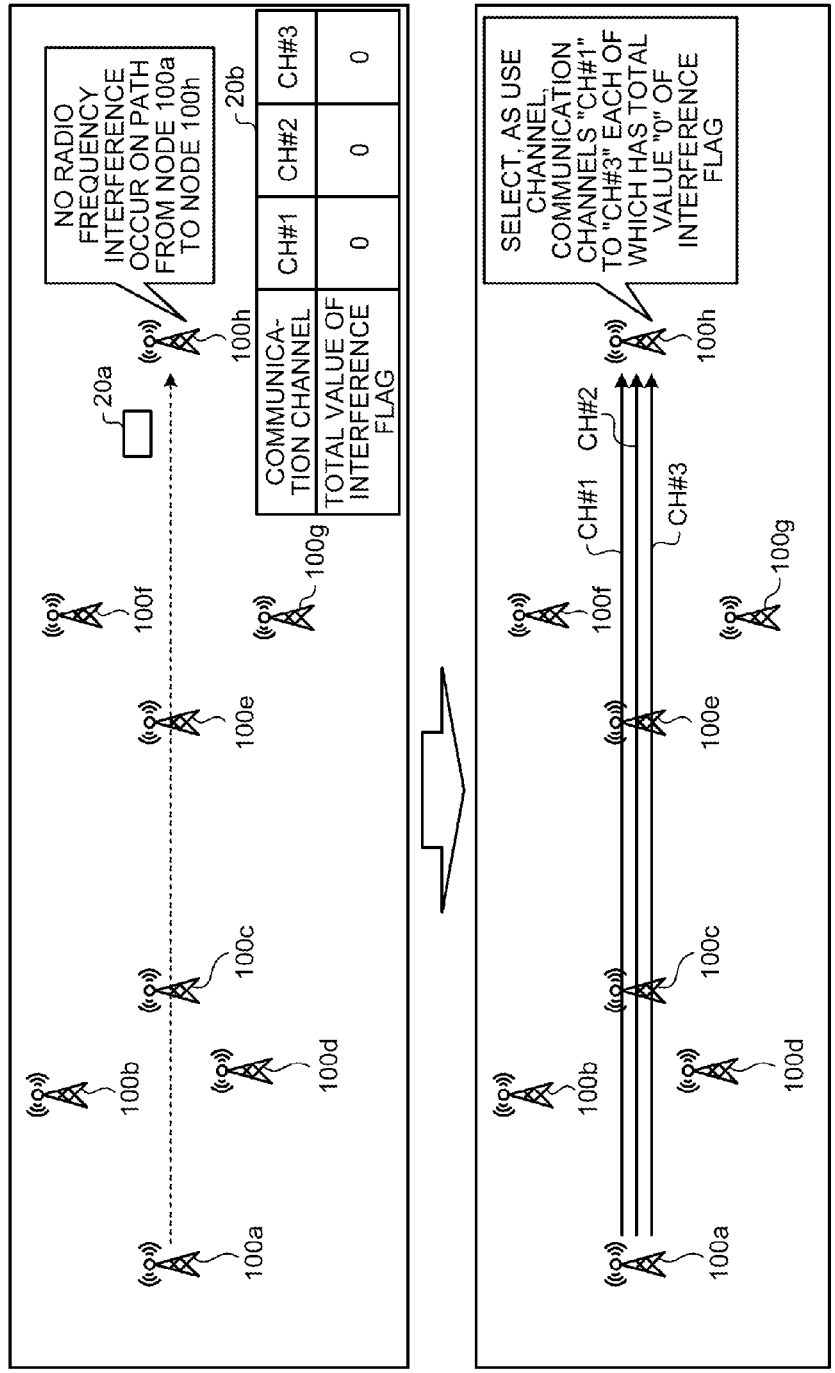
FIG. 17 is a schematic diagram illustrating a process performed when radio frequency interference has not occurred in all of the node included in a communication path.

In the following, a description will be given of a specific example in which the node 100 according to the embodiment selects a use channel. FIG. 17 is a schematic diagram illustrating a process performed when radio frequency interference has not occurred in all of the nodes included in a communication path. In the example illustrated in FIG. 17, it is assumed that the node 100a is the send source node that is the send source of data and assumed that the node 100h is the destination node that is the destination of the data. Furthermore, it is assumed that radio frequency interference has not occurred in the node 100a, the node 100c, the node 100e, the node 100h, all of which are included in the communication path from the node 100a, which is the send source node, to the node 100h, which is the destination node.

As illustrated in the upper portion of FIG. 17, the node 100h receives a confirmation packet 20a sent from the node 100a and then determines that the node 100h itself corresponds to the destination of the confirmation packet 20a. On the basis of information that is obtained by adding the interference information on its own node 100h to all pieces of the interference information that are included in the confirmation packet 20a, the node 100h calculates a total value 20b of the interference flag related to each of the communication channels. Specifically, the node 100h calculates the total value "0" of the interference flag related to the communication channel "CH#1", calculates the total value "0" of the interference flag related to the communication channel "CH#2", and calculates the total value "0" of the interference flag related to the communication channel "CH#3".

Then, as illustrated in the lower portion of FIG. 17, the node 100h selects, as a use channel, the communication channels "CH#1" to "CH#3" each of which has the total value of "0" of the interference flag. Consequently, the nodes 100a, 100c, 100e, and 100h can start to send and receive data by using the communication channels "CH#1" to "CH#3" in which the effect of the radio frequency interference is the smallest.

Figure 18:
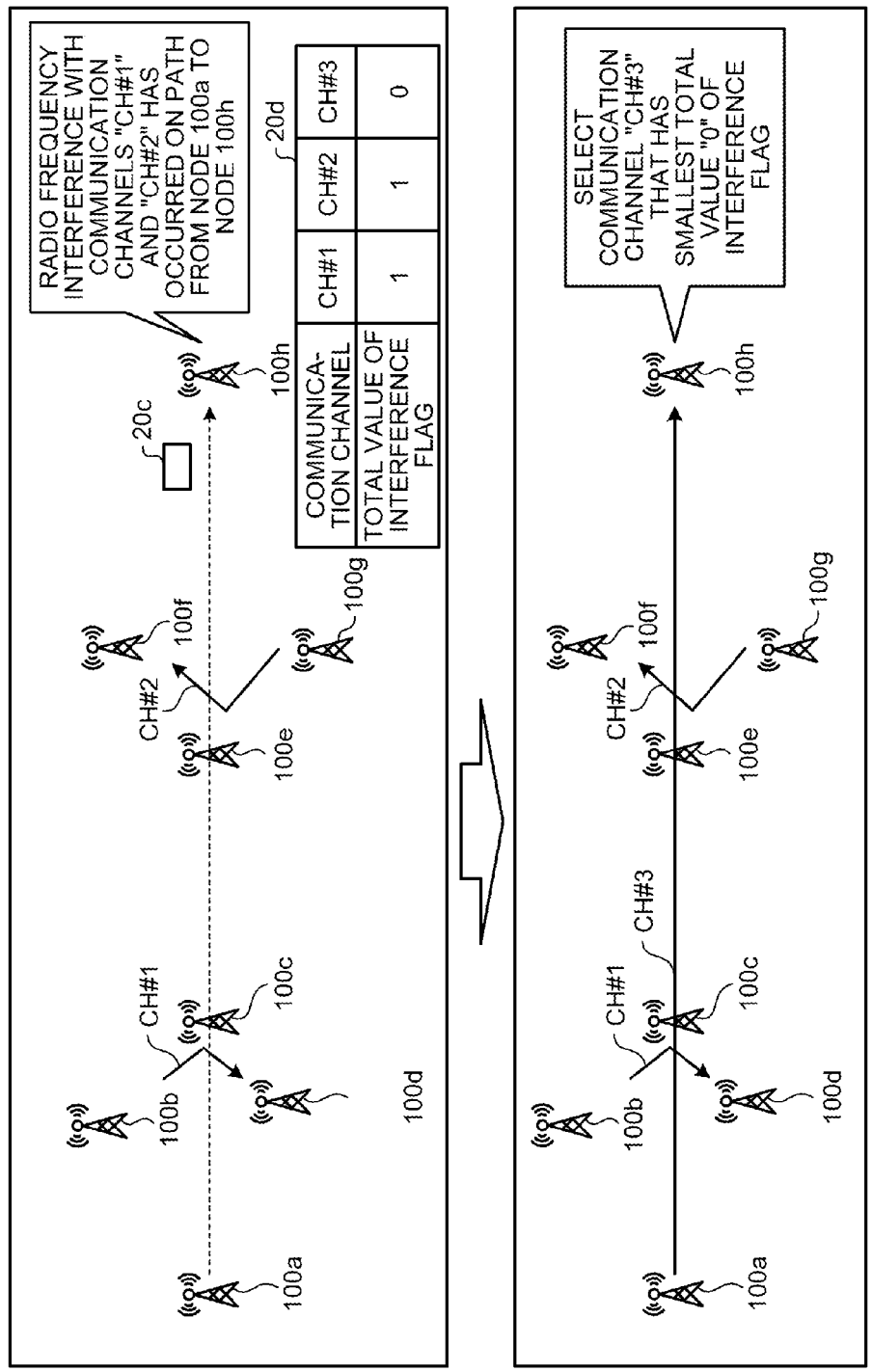
FIG. 18 is a schematic diagram illustrating a process performed when radio frequency interference occurs in some nodes included in the communication path (No. 1)

In the following, a description will be given of a case in which radio frequency interference has occurred in some nodes that are included in a communication path. FIG. 18 is a schematic diagram illustrating a process performed when radio frequency interference occurs in some nodes included in the communication path (No. 1). In the example illustrated in FIG. 18, it is assumed that the node 100a is the send source node and the node 100h is the destination node. Furthermore, it is assumed that radio frequency interference with the communication channels "CH#1" and "CH#2" has occurred in the nodes 100c and 100e that are included in the communication path from the node 100a, which is the send source node, to the node 100h, which is the destination node.

As illustrated in the upper portion of FIG. 18, the node 100h receives a confirmation packet 20c sent from the node 100a and then determines that the node 100h itself corresponds to the destination of the confirmation packet 20c. On the basis of information obtained by adding the interference information on its own node 100h to all pieces of the interference information included in the confirmation packet 20c, the node 100h calculates a total value 20d of the interference flag related to each of the communication channels. Specifically, the node 100h calculates the total value "1" of the interference flag related to the communication channel "CH#1", calculates the total value "1" of the interference flag related to the communication channel "CH#2", and calculates the total value "0" of the interference flag related to the communication channel "CH#3".

Then, as illustrated in the lower portion of FIG. 18, the node 100h selects, as a use channel, the communication channel "CH#3" that has the smallest total value of "0" of the interference flag. Consequently, the nodes 100a, 100c, 100e, and 100h can start to send and receive data by using the communication channel "CH#3" in which the effect of the radio frequency interference is the smallest.

Figure 19:
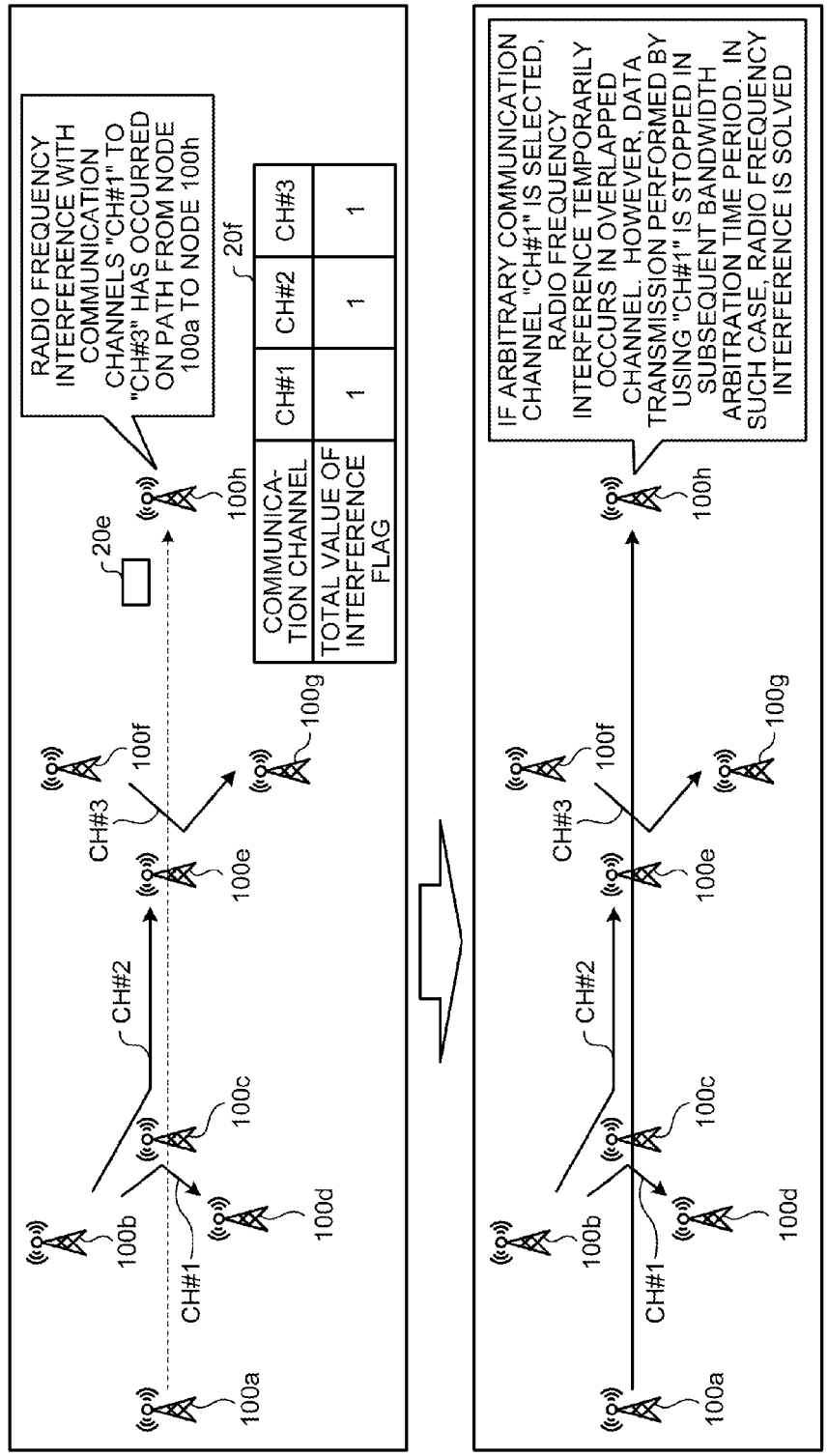
FIG. 19 is a schematic diagram illustrating a process performed when radio frequency interference occurs in some nodes included in the communication path (No. 2)

FIG. 19 is a schematic diagram illustrating a process performed when radio frequency interference occurs in some nodes included in the communication path (No. 2). In the example illustrated in FIG. 19, it is assumed that the node 100a is the send source node and the node 100h is the destination node. Furthermore, it is assumed that radio frequency interference with the communication channels "CH#1", "CH#2", and "CH#3" has occurred in the nodes 100c and 100e that are included in the communication path from the node 100a, which is the send source node, to the node 100h, which is the destination node.

As illustrated in the upper portion of FIG. 19, the node 100h has received a confirmation packet 20e sent from the node 100a and determines that the node 100h itself corresponds to the destination of the confirmation packet 20e. On the basis of the information obtained by adding the interference information on its own node 100h to all of the pieces of the interference information included in the confirmation packet 20e, the node 100h calculates a total value 20f of the interference flag related to each of the communication channels. Specifically, the node 100h calculates the total value "1" of the interference flag related to the communication channel "CH#1", calculates the total value "1" of the interference flag related to the communication channel "CH#2", and calculates the total value "1" of the interference flag related to the communication channel "CH#3".

Subsequently, as illustrated in the lower portion of FIG. 19, because the total values of the interference flag related to each of the communication channels are other than "0" and are all the same, the node 100h selects the communication channel "CH#1" that is an arbitrary communication channel as a use channel. At this point, if the communication channel "CH#1" is arbitrarily selected as a use channel, radio frequency interference temporarily occurs in an overlapped channel. In the example illustrated in FIG. 19, because the nodes 100b, 100c, and 100d are sending data by using the communication channel "CH#1" that is the overlapped channel, the radio frequency interference has temporarily occurred in the overlapped channel.

However, even if the radio frequency interference temporarily occurs in the current bandwidth arbitration time period, there may be a case in which, in the subsequent bandwidth arbitration time period, data transmission performed by using the overlapped channel is stopped. In such a case, in the subsequent bandwidth arbitration time period, the radio frequency interference occurring in the overlapped channel is solved and the total value of the interference flag related to the overlapped channel becomes the smallest. In the example illustrated in FIG. 19, the nodes 100b, 100c, and 100d may possibly stop the data transmission performed by using the communication channel "CH#1", which is an overlapped channel, in the subsequent bandwidth arbitration time period. In such a case, in the subsequent bandwidth arbitration time period, the radio frequency interference occurring in the communication channel "CH#1" is solved and the total value of the interference flag related to the communication channel "CH#1" becomes the smallest. Consequently, in the subsequent bandwidth arbitration time period, the node 100h selects the communication channel with the smallest total value of the interference flag, i.e., the appropriate communication channel "CH#1" in which the effect of the radio frequency interference is the smallest as a use channel.

Figure 20:
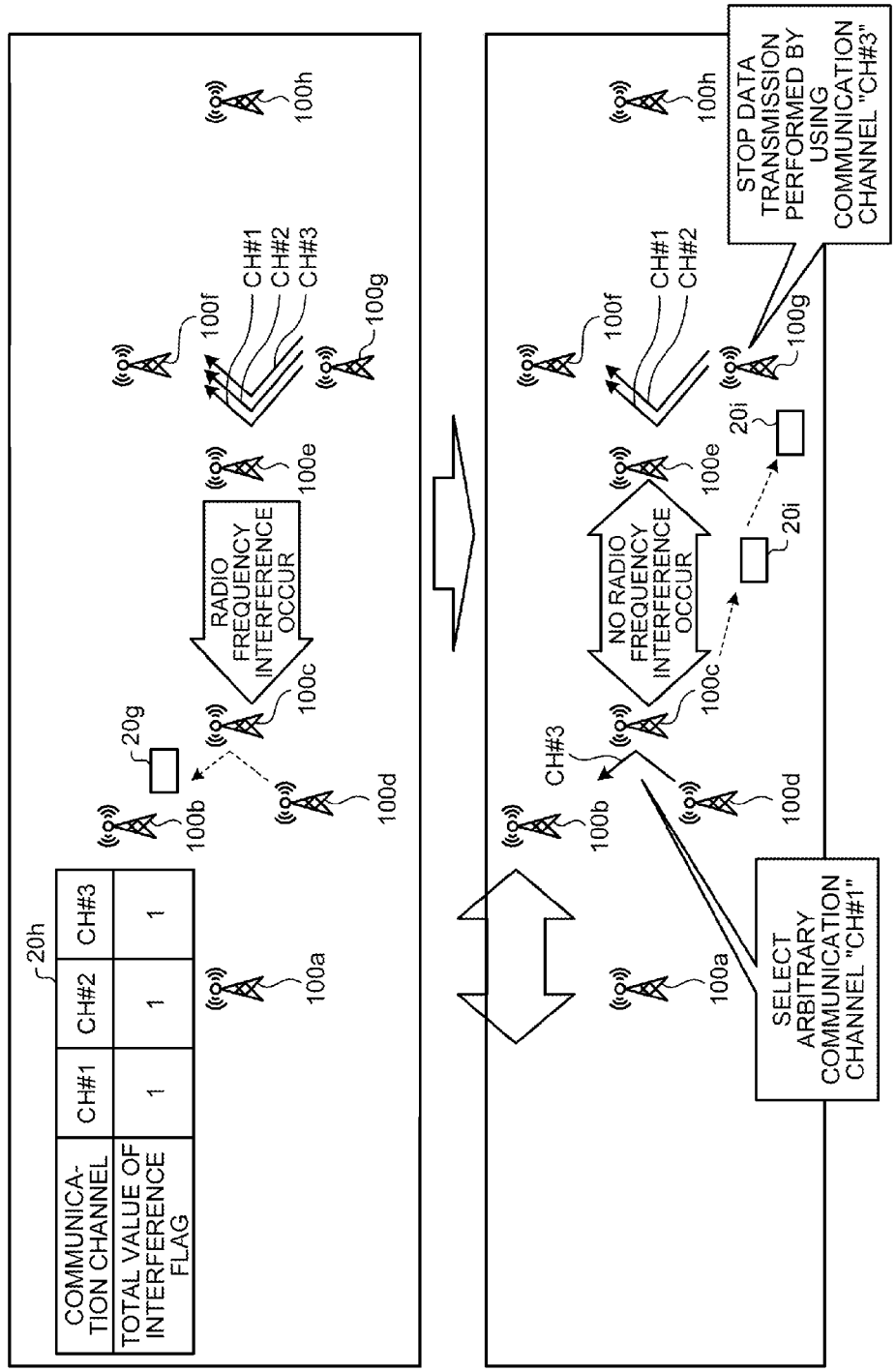
FIG. 20 is a schematic diagram illustrating a process performed when radio frequency interference occurs in some nodes included in the communication path (No. 3)

FIG. 20 is a schematic diagram illustrating a process performed when radio frequency interference occurs in some nodes included in the communication path (No. 3). In the example illustrated in FIG. 20, it is assumed that the node 100d is the send source node and the node 100b is the destination node. Furthermore, it is assumed that radio frequency interference with the communication channels "CH#1", "CH#2", and "CH#3" has occurred in the node 100c that is included in the communication path from the node 100d, which is the send source node, to the node 100b, which is the destination node.

As illustrated in the upper portion of FIG. 20, the node 100b has received a confirmation packet 20g sent from the node 100d and determines that the node 100b itself corresponds to the destination of the confirmation packet 20g. On the basis of information obtained by adding the interference information on its own node 100b to all of the pieces of the interference information included in the confirmation packet 20g, the node 100b calculates a total value 20h of the interference flag for each communication channel. Specifically, the node 100b calculates the total value "1" of the interference flag related to the communication channel "CH#1", calculates the total value "1" of the interference flag related to the communication channel "CH#2", and calculates the total value "1" of the interference flag related to the communication channel "CH#3".

Subsequently, as illustrated in the lower portion of FIG. 20, because the total values of the interference flag related to the communication channels are other than "0" and are all the same, the node 100b selects the communication channel "CH#3" that is an arbitrary communication channel as a use channel. The node 100c specifies the node 100e as an interference node from among the peripheral nodes that are associated with the communication channel "CH#3" that is a use channel. The node 100c sends a channel reduction request packet 20i, in which the communication channel "CH#3" is stored in the reduction channel, to the node 100e that is an interference node. The node 100e receives the channel reduction request packet 20i. Because the node 100e itself does not correspond to the send source of the data sent by using the communication channel "CH#3" that is stored in the channel reduction request packet 20i, the node 100e transfers the channel reduction request packet 20i to the node 100g that is the send source of the data. The node 100g receives the channel reduction request packet 20i. The node 100g is sending the data by using the communication channels "CH#1" and "CH#2" that are other than the communication channel "CH#3" included in the channel reduction request packet 20i. The node 100g stops the data transmission that is performed by using the communication channel "CH#3". Consequently, the nodes 100d, 100c, and 100b can start to send and receive the data by using the communication channel "CH#3" in which the effect of the radio frequency interference is the smallest.

Figure 21:
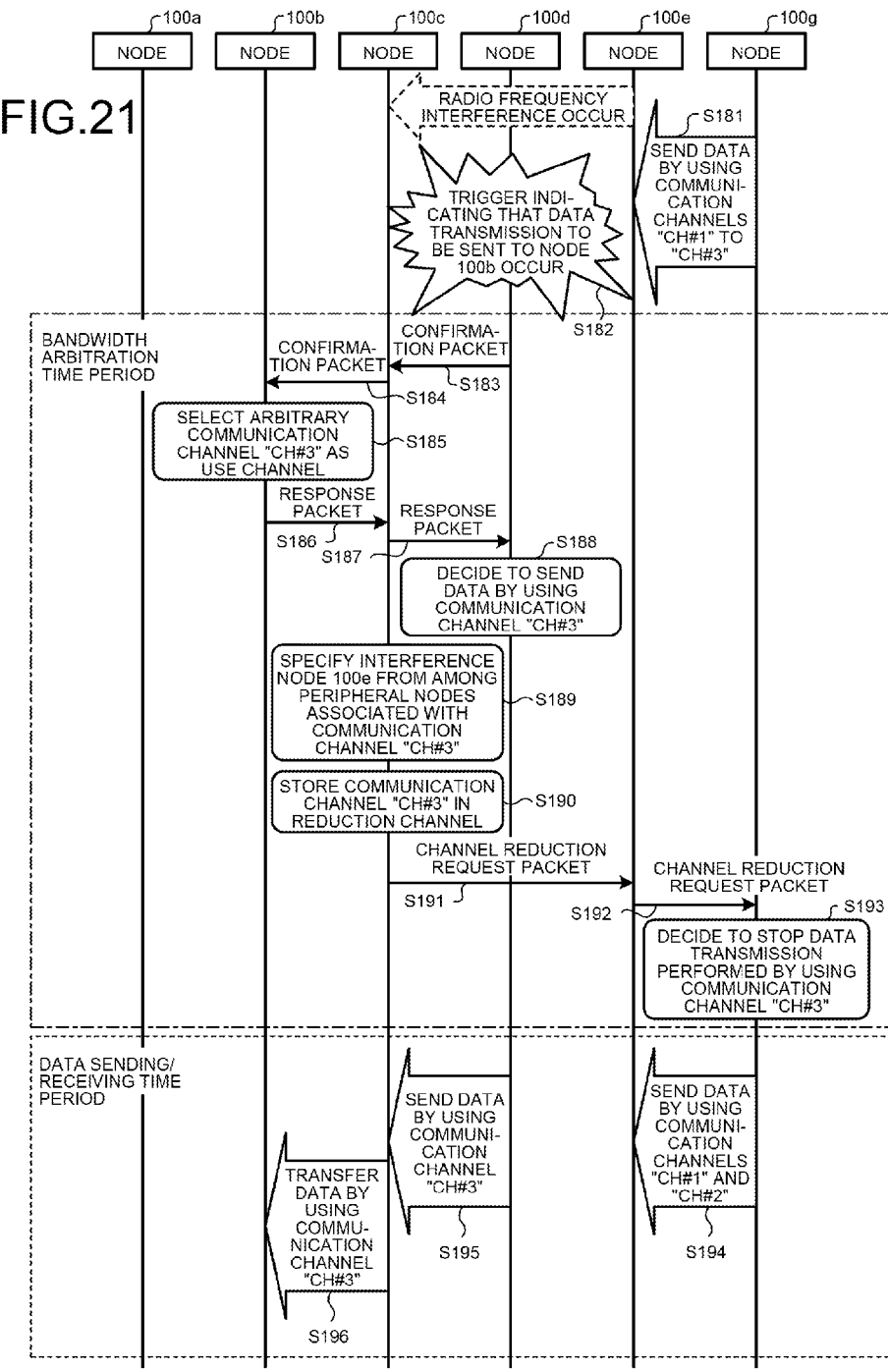
FIG. 21 is a sequence diagram illustrating the flow of a process performed in the entirety of the multi hop network according to the embodiment.
Figure 24:
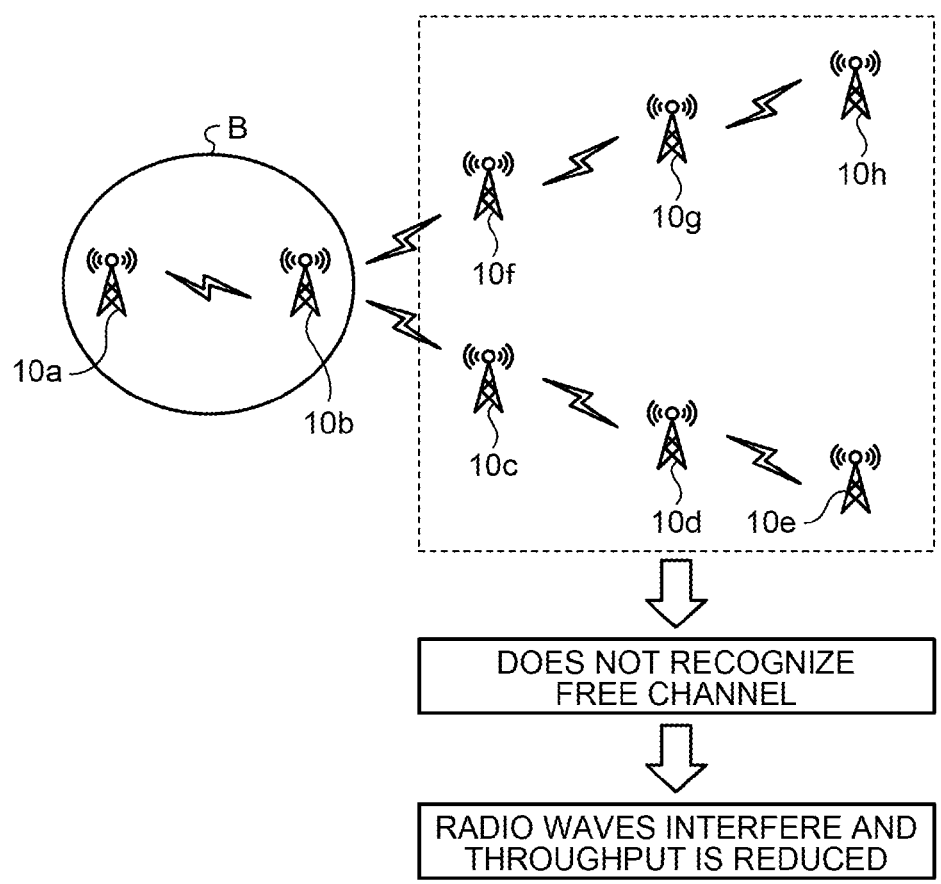
FIG. 24 is a schematic diagram illustrating a problem of a conventional technology.

In the following, a description will be given of the flow of an overall process performed in the multi hop network according to the embodiment. FIG. 21 is a sequence diagram illustrating the flow of a process performed in the entirety of the multi hop network according to the embodiment. The flow of the process illustrated in FIG. 20 will be described as an example.

As illustrated in FIG. 21, the node 100g is sending data to the node 100e by using the communication channels "CH#1" to "CH#3" (Step S181). Consequently, radio frequency interference with the communication channels "CH#1" to "CH#3" has occurred in the node 100c in the communication path from the node 100d, which is the send source node, to the node 100b, which is the destination node. A trigger indicating that transmission of data to be sent to the node 100b occurs in the node 100d that is the send source node and the time reaches the bandwidth arbitration time period (Step S182).

The node 100d sends, to the node 100c, a confirmation packet in which the value of the interference flag for each communication channel is set in each of the pieces of the interference information and the address of the node 100b that corresponds to the destination of the data is stored in the destination (Step S183). The confirmation packet sent at Step S183 is the packet, for example, illustrated in FIG. 22. FIG. 22 is a schematic diagram illustrating an example of a confirmation packet sent by the node 100d.

The node 100c receives the confirmation packet from the node 100d. Because the node 100c itself is not indicated in the destination stored in the confirmation packet, the node 100c sends, to the node 100b, the confirmation packet in which interference information stored in the interference information storing unit 103 is additionally stored (Step S184). The confirmation packet transferred at Step S184 is the packet illustrated in, for example, FIG. 23. FIG. 23 is a schematic diagram illustrating an example of a confirmation packet transferred by the node 100c.

The node 100b receives the confirmation packet from the node 100c and determines that the node 100b itself corresponds to the destination of the confirmation packet. The node 100b calculates the total value of the interference flag related for each communication channel on the basis of the information obtained by adding the interference information on its own node 100b to all of the pieces of the interference information included in the confirmation packet. Because the total values of the interference flag related to the communication channels are other than "0" and are all the same, the node 100b selects the arbitrary communication channel "CH#3" as a use channel (Step S185).

The node 100b stores the communication channel "CH#3", which is the selected use channel, in a use channel and sends, to the node 100c, a response packet in which the address of the node 100d that corresponds to the send source of the confirmation packet is stored in the destination (Step S186).

The node 100c receives the response packet from the node 100b and retains the use channel that is stored in the response packet. The node 100c sets the use channel stored in the response packet in the wireless interface unit 101 in the node 100c itself. The node 100c transfers the response packet to the node 100d (Step S187).

The node 100d receives the response packet from the node 100c and retains the use channel that is stored in the response packet. By setting the use channel stored in the response packet in the wireless interface unit 101 in the node 100d itself, the node 100d decides to use the communication channel "CH#3", which is the use channel, and to send the data (Step S188).

The node 100c specifies the node 100e that is an interference node from among the peripheral nodes associated with the communication channel "CH#3" that is the use channel (Step S189). The node 100c stores the communication channel "CH#3" in the reduction channel in a channel reduction request packet (Step S190). The node 100c sends, to the node 100e that is the interference node, the channel reduction request packet in which the communication channel "CH#3" is stored in the reduction channel (Step S191).

The node 100e receives the channel reduction request packet from the node 100c. Because the node 100e itself does not corresponds to the send source of the data performed by using the communication channel "CH#3" that is stored in the channel reduction request packet, the node 100e transfers the channel reduction request packet to the node 100g that is the send source of the data (Step S192).

The node 100g receives the channel reduction request packet from the node 100e. The node 100g was sending data by using the communication channels "CH#1" and "CH#2" that are other than the communication channel "CH#3" that is included in the channel reduction request packet. Accordingly, the node 100g stops the data transmission performed by using the communication channel "CH#3" (Step S193).

If the bandwidth arbitration time period ends and thus the time reaches the data sending/receiving time period, the node 100g sends the data to the node 100e by using the communication channels "CH#1" and "CH#2" (Step S194). If the bandwidth arbitration time period ends and thus the time reaches the data sending/receiving time period, the node 100d sends the data to the node 100c by using the communication channel "CH#3" (Step S195). If the bandwidth arbitration time period ends and thus the time reaches the data sending/receiving time period, the node 100c transfers the data to the node 100b by using the communication channel "CH#3" (Step S196).

In the following, an advantage of the node 100 according to the embodiment will be described. While switching multiple communication channels that can be used to send and receive data, the node 100 detects, for each communication channel, interference information that indicates whether radio frequency interference with peripheral nodes is present. In the bandwidth arbitration time period that is present before the data sending/receiving time period, the node 100 sends, to a destination node, a confirmation packet in which pieces of interference information are sequentially stored for nodes. The node 100 receives the confirmation packet and transfers, if the node 100 itself does not correspond to the destination node that is the destination of the confirmation packet, the confirmation packet in which the interference information on its own node 100 is additionally stored in another node. If the node 100 itself corresponds to the destination node that is the destination of the confirmation packet, on the basis of the pieces of the interference information that are sequentially stored in the confirmation packet for nodes and on the basis of the interference information on the node 100 itself, the node 100 selects a use channel that is actually used to send and receive the data. Consequently, the node 100 can recognize the status of the occurrence of the radio frequency interference in each node included in the communication path for the destination node. Furthermore, by using this status of the occurrence of the radio frequency interference, the node 100 can select, as a use channel, an appropriate communication channel in which the effect of the radio frequency interference is the smallest. Thus, the node 100 can select an appropriate communication channel in which the throughput is reduced.

Furthermore, if the interference information on a use channel indicates the occurrence of radio frequency interference, the node 100 according to the embodiment specifies an interference node from among the peripheral nodes associated with the use channel and then sends a channel reduction request packet that requests the node to stop the data transmission that is performed by using the use channel. Accordingly, the node 100 reliably eliminates the radio frequency interference with the use channel received from another node and thus effectively suppresses a reduction in the throughput.

Furthermore, the node 100 according to the embodiment receives a channel reduction request packet and stops the data transmission that is performed by using a use channel if the node itself 100 performs the data transmission by using the use channel and uses another communication channel other than the use channel. Consequently, the node 100 can safely maintain communication with the other node that is the source of radio frequency interference while eliminating the radio frequency interference with the use channel received from the other node.

Furthermore, the node 100 according to the embodiment receives a channel reduction request packet and transfers, if the node 100 itself does not perform the data transmission by using the use channel, a channel reduction request packet to the other node that is the send source of the data. Consequently, even if the node that is the source of the radio frequency interference with respect to the use channel is not the node that is the send source of the data, the node 100 can request the node of the send source of the data to stop the data transmission performed by using the use channel.

According to an aspect of an embodiment of the wireless device disclosed in the present invention, an advantage is provided in that an appropriate communication channel that suppress a reduction in the throughput can be selected.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A wireless device comprising:
   a detecting unit configured to detect, for each communication channel while switching multiple communication channels, interference information indicating whether radio frequency interference from a peripheral wireless device is present;
   a sending unit configured to send, before data is sent and received, to a destination wireless device that is the destination of the data, a packet in which pieces of the interference information detected by the detecting unit are sequentially stored for wireless devices; and
   a selecting unit configured to receive the packet, to transfer, when the wireless device does not correspond to the destination wireless device that is the destination of the packet, the packet in which the interference information detected by the detecting unit is additionally stored, and to select, when the wireless device corresponds to the destination wireless device that is the destination of the packet, on the basis of the pieces of the interference information that are sequentially stored in the packet for wireless devices and on the basis of the interference information detected by the detecting unit, the communication channel that is used to send and receive the data from among the multiple communication channels.

2. The wireless device according to claim 1, further comprising a channel reduction control unit configured to specify, when the interference information detected by the detecting unit indicates that the radio frequency interference with a use channel that is the communication channel selected by the selecting unit is present, from among peripheral wireless devices that send and receive data by using the use channel, an interference wireless device that emits a radio wave that is equal to or greater than a threshold and configured to send, to the specified interference wireless device, a channel reduction request packet that requests the specified interference wireless device to stop to send the data performed by using the use channel.

3. The wireless device according to claim 2, wherein, when the channel reduction control unit receives the channel reduction request packet from another wireless device and when the wireless device is sending data by using the use channel and is sending data by using another communication channel that is other than the use channel, the channel reduction control unit stops to send the data performed by using the use channel.

4. The wireless device according to claim 2, wherein, when the channel reduction control unit receives the channel reduction request packet from another wireless device and when the wireless device is not sending data by using the use channel, the channel reduction control unit transfers the channel reduction request packet to the other wireless device that is the send source of the data.

5. A communication channel selection method performed by a computer, the communication channel selection method comprising:
  detecting, for each communication channel while switching multiple communication channels, interference information indicating whether radio frequency interference from a peripheral wireless device is present;
  sending, to a destination wireless device that is the destination of data before the data is sent and received, a packet in which the detected pieces of interference information are sequentially stored for wireless devices; and
  receiving the packet, transferring, when the computer does not correspond to the destination wireless device that is the destination of the packet, the packet in which the detected interference information is additionally stored, and selecting, when the computer corresponds to the destination wireless device that is the destination of the packet, on the basis of the pieces of interference information that are sequentially stored in the packet for wireless devices and on the basis of the detected interference information, the communication channel that is used to send and receive the data from among the multiple communication channels.

\* \* \* \* \*